(12) United States Patent
Maruhashi et al.

(10) Patent No.: US 10,074,984 B2
(45) Date of Patent: Sep. 11, 2018

(54) ELECTRIC POWER CONTROL SYSTEM

(71) Applicant: NEC Corporation, Tokyo (JP)

(72) Inventors: Kenichi Maruhashi, Tokyo (JP); Takashi Harada, Tokyo (JP)

(73) Assignee: NEC Corporation, Tokyo (JP)

( * ) Notice: Subject to any disclaimer, the term of this patent is extended or adjusted under 35 U.S.C. 154(b) by 370 days.

(21) Appl. No.: 14/780,655

(22) PCT Filed: Apr. 7, 2014

(86) PCT No.: PCT/JP2014/001990
§ 371 (c)(1),
(2) Date: Sep. 28, 2015

(87) PCT Pub. No.: WO2014/167830
PCT Pub. Date: Oct. 16, 2014

(65) Prior Publication Data
US 2016/0056630 A1   Feb. 25, 2016

(30) Foreign Application Priority Data

Apr. 9, 2013  (JP) .................................. 2013-081353

(51) Int. Cl.
*G05D 3/12* (2006.01)
*H02J 3/28* (2006.01)
(Continued)

(52) U.S. Cl.
CPC .............. *H02J 3/28* (2013.01); *G05B 15/02* (2013.01); *H02J 3/32* (2013.01); *H02J 7/34* (2013.01)

(58) Field of Classification Search
CPC ..... H02J 3/14; H02J 3/28; H02J 3/381; Y02B 70/3225; Y02B 60/1282; Y02E 10/566;
(Continued)

(56) References Cited

U.S. PATENT DOCUMENTS 4,910,630 A * 3/1990 Kastner ............ G01R 19/16542
307/10.1
5,880,954 A * 3/1999 Thomson ................ F16P 3/144
250/221
(Continued)

FOREIGN PATENT DOCUMENTS

JP   2000-333373 A   11/2000
JP   2002-165367 A    6/2002
(Continued)

OTHER PUBLICATIONS

International Search Report corresponding to PCT/JP2014/001990, dated Jun. 24, 2014 (5 pages).

*Primary Examiner* — Darrin D Dunn
(74) *Attorney, Agent, or Firm* — Wilmer Cutler Pickering Hale and Dorr LLP

(57) ABSTRACT

An electric power control system of the present invention includes an electric power supplying means, a load means, and an energy storing means. The electric power control system includes: an energy storage controlling means for controlling the energy storing means so as to decrease charge or discharge electric power over a response time corresponding to a set time constant for energy storing means; and a supplied energy controlling means for executing control to change electric power supplied by the electric power supplying means over a response time corresponding to a set time constant for electric power supplying means so that the electric power supply and demand difference is kept within the preset given range. The time constant for energy storing means is set to be longer than the time constant for electric power supplying means.

12 Claims, 13 Drawing Sheets

(51) Int. Cl.
*H02J 3/32* (2006.01)
*G05B 15/02* (2006.01)
*H02J 7/34* (2006.01)

(58) Field of Classification Search
CPC ....... Y02E 70/30; Y02E 40/72; Y02E 60/722; Y04S 20/222; Y04S 30/12
See application file for complete search history.

(56) References Cited

U.S. PATENT DOCUMENTS

| | | | | |
|---|---|---|---|---|
| 6,493,616 | B1* | 12/2002 | Rossow | E02F 9/205 37/414 |
| 6,923,285 | B1* | 8/2005 | Rossow | E02F 3/3695 180/272 |
| 7,840,432 | B2* | 11/2010 | Lamb, III | G06Q 10/063 700/95 |
| 8,008,804 | B2* | 8/2011 | Capp | H02J 3/30 307/44 |
| 9,165,421 | B2* | 10/2015 | Lyons | G07F 17/3211 |
| 9,620,990 | B2* | 4/2017 | Takehara | H02J 7/35 |
| 2002/0054107 | A1* | 5/2002 | Paunonen | G05B 23/0272 715/764 |
| 2002/0128759 | A1* | 9/2002 | Sodoski | B60L 15/2045 701/36 |
| 2005/0077881 | A1* | 4/2005 | Capp | H02J 3/30 322/29 |
| 2005/0151845 | A1* | 7/2005 | Tsukada | E02F 9/26 348/148 |
| 2008/0059120 | A1* | 3/2008 | Xiao | G06F 11/008 702/184 |
| 2009/0005927 | A1* | 1/2009 | Schlatre | G06Q 10/06 701/29.5 |
| 2009/0110289 | A1* | 4/2009 | Maggiore | G06T 7/001 382/195 |
| 2009/0312885 | A1* | 12/2009 | Buiel | H02J 3/32 700/297 |
| 2010/0138070 | A1* | 6/2010 | Beaudoin | F03D 7/0284 700/297 |
| 2010/0177359 | A1* | 7/2010 | Miyazaki | H04N 1/00344 358/406 |
| 2010/0211233 | A1* | 8/2010 | Roscoe | H02J 3/008 700/296 |
| 2010/0231045 | A1* | 9/2010 | Collins | F01B 21/04 307/47 |
| 2011/0040418 | A1* | 2/2011 | Kalen | F03D 9/007 700/291 |
| 2011/0068946 | A1* | 3/2011 | Sato | G05B 13/024 340/870.01 |
| 2011/0115816 | A1* | 5/2011 | Brackney | G06Q 10/06 345/629 |
| 2011/0238232 | A1* | 9/2011 | Tomita | H02J 3/32 700/291 |
| 2011/0254372 | A1* | 10/2011 | Haines | H02J 9/062 307/66 |
| 2011/0278853 | A1* | 11/2011 | Capp | H02J 3/30 290/1 A |
| 2012/0046795 | A1* | 2/2012 | Kelty | B60L 11/1857 700/291 |
| 2012/0059528 | A1* | 3/2012 | Umesawa | G01D 4/002 700/295 |
| 2012/0119579 | A1* | 5/2012 | Jin | H02J 3/28 307/60 |
| 2012/0197451 | A1* | 8/2012 | Jang | G06Q 10/063 700/291 |
| 2012/0245744 | A1* | 9/2012 | Prosser | H02J 3/46 700/286 |
| 2013/0030590 | A1* | 1/2013 | Prosser | H02J 3/14 700/295 |
| 2013/0046415 | A1* | 2/2013 | Curtis | H02J 3/38 700/297 |
| 2013/0159736 | A1* | 6/2013 | Yanagawa | G06F 1/263 713/300 |
| 2013/0166084 | A1* | 6/2013 | Sedighy | G06Q 50/06 700/291 |
| 2013/0184882 | A1* | 7/2013 | Momose | B60L 11/1838 700/286 |
| 2013/0245850 | A1* | 9/2013 | Okayama | G06F 1/26 700/295 |
| 2013/0317658 | A1* | 11/2013 | Takahashi | H02J 3/14 700/286 |
| 2014/0025217 | A1* | 1/2014 | Jin | H02J 13/0006 700/295 |
| 2014/0094985 | A1* | 4/2014 | Hibiya | H01M 10/44 700/297 |
| 2014/0210271 | A1* | 7/2014 | Toyoda | H02J 3/46 307/66 |
| 2014/0351621 | A1* | 11/2014 | Conroy | G06F 1/26 713/340 |
| 2014/0379154 | A1* | 12/2014 | Watanabe | G06Q 50/06 700/291 |
| 2015/0008864 | A2* | 1/2015 | Wolter | H02J 7/35 320/101 |
| 2015/0012146 | A1* | 1/2015 | Cherian | H02J 3/00 700/291 |
| 2015/0103180 | A1* | 4/2015 | Bauer | H04N 7/183 348/159 |
| 2015/0120077 | A1* | 4/2015 | Kumazawa | G05B 13/0205 700/297 |
| 2015/0214737 | A1* | 7/2015 | Ichino | G05B 15/02 700/297 |
| 2015/0270743 | A1* | 9/2015 | Orthlieb | H02J 3/00 165/288 |
| 2015/0280434 | A1* | 10/2015 | Walter | H02J 3/008 700/295 |
| 2015/0303690 | A1* | 10/2015 | Miyazaki | H02J 7/34 700/291 |
| 2016/0013652 | A1* | 1/2016 | Li | H02J 3/32 307/24 |
| 2016/0064934 | A1* | 3/2016 | Zhao | H02J 3/32 700/287 |
| 2016/0149415 | A1* | 5/2016 | Ijichi | H02J 3/32 307/66 |
| 2016/0364285 | A1* | 12/2016 | Swayne | G06F 11/0739 |
| 2017/0133866 | A1* | 5/2017 | Itoh | H02J 7/0021 |
| 2017/0193769 | A1* | 7/2017 | McSheffrey | G08B 7/066 |

FOREIGN PATENT DOCUMENTS

| | | |
|---|---|---|
| JP | 2006-203959 A | 8/2006 |
| JP | 2008-099431 A | 4/2008 |
| JP | 2010-057311 A | 3/2010 |
| JP | 2011-114899 A | 6/2011 |
| JP | 2012-139007 A | 7/2012 |

\* cited by examiner

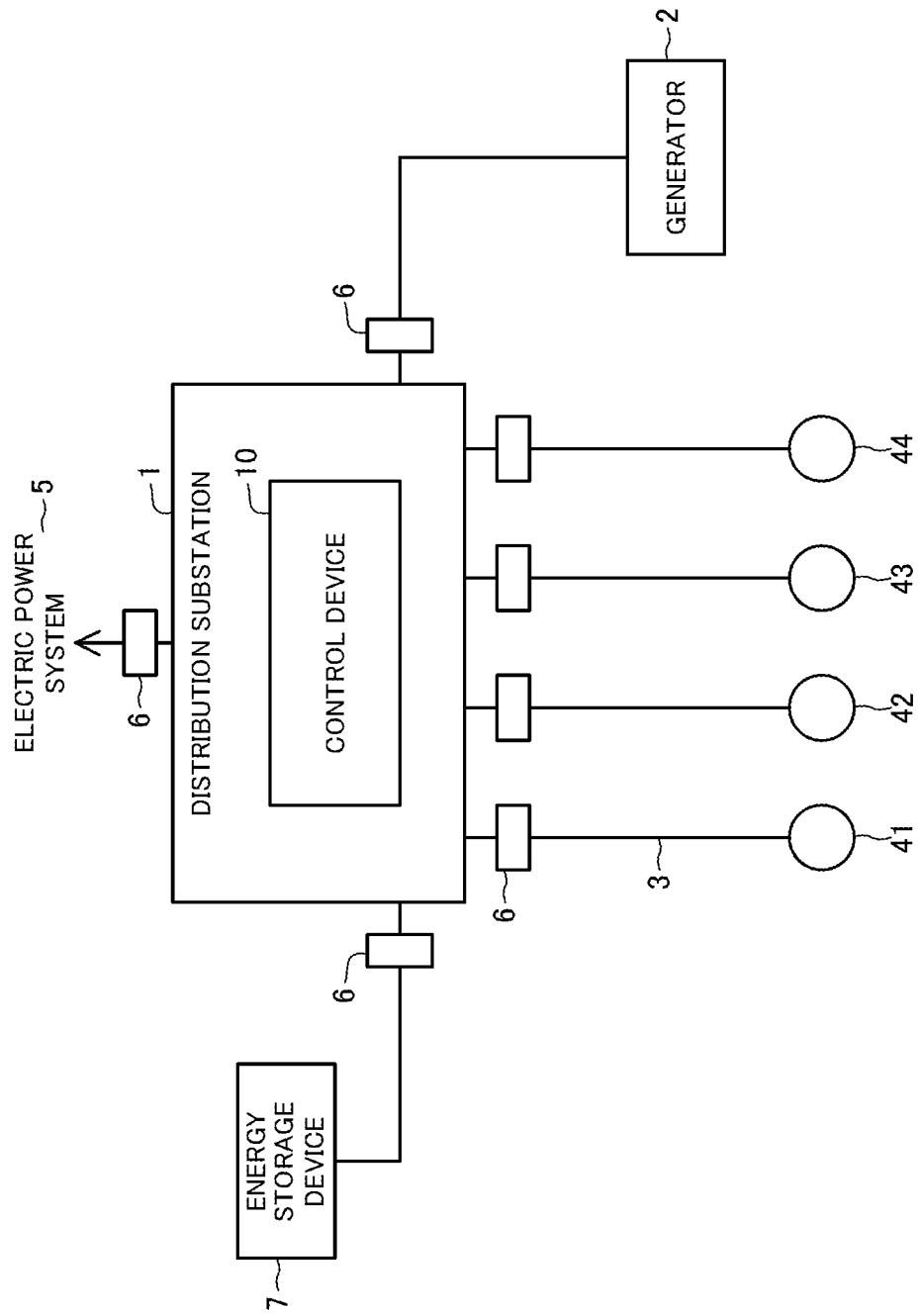

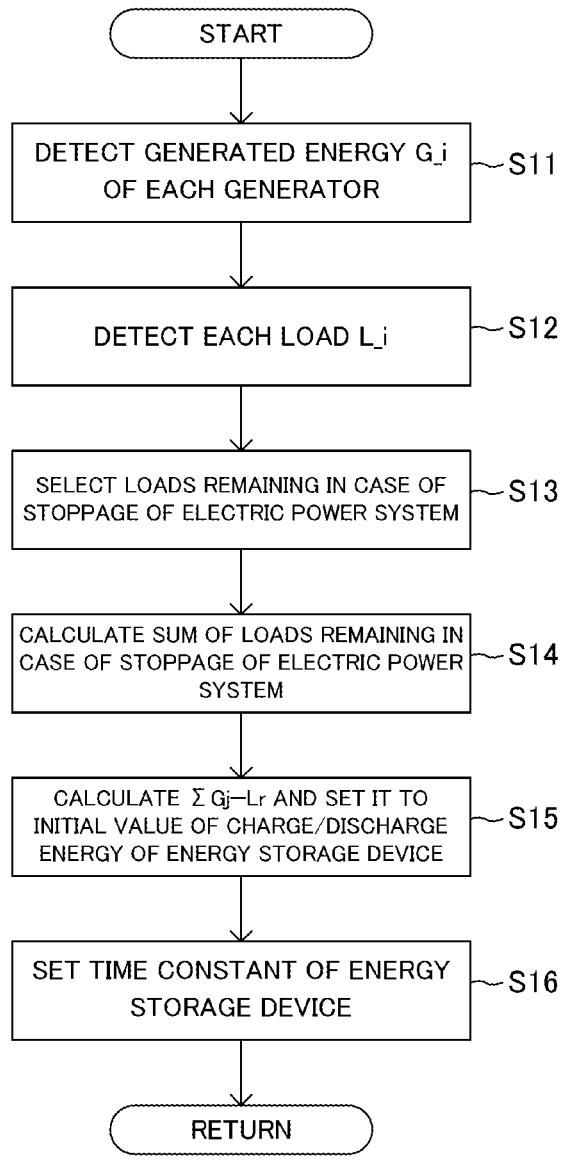

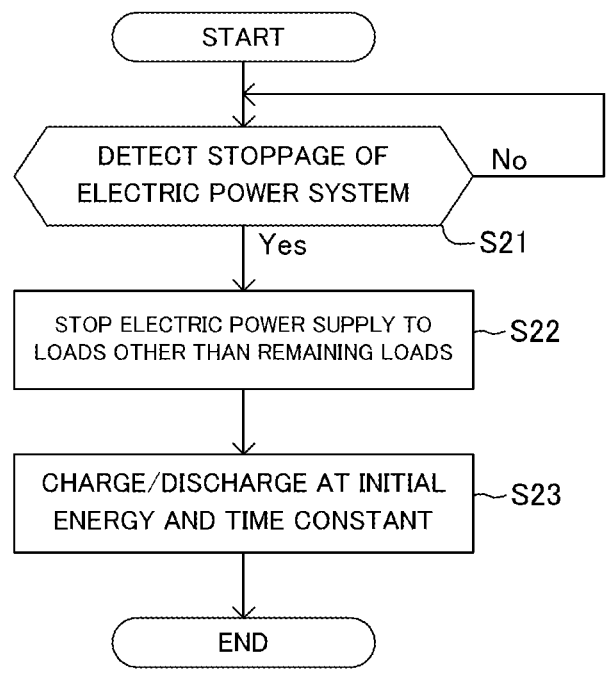

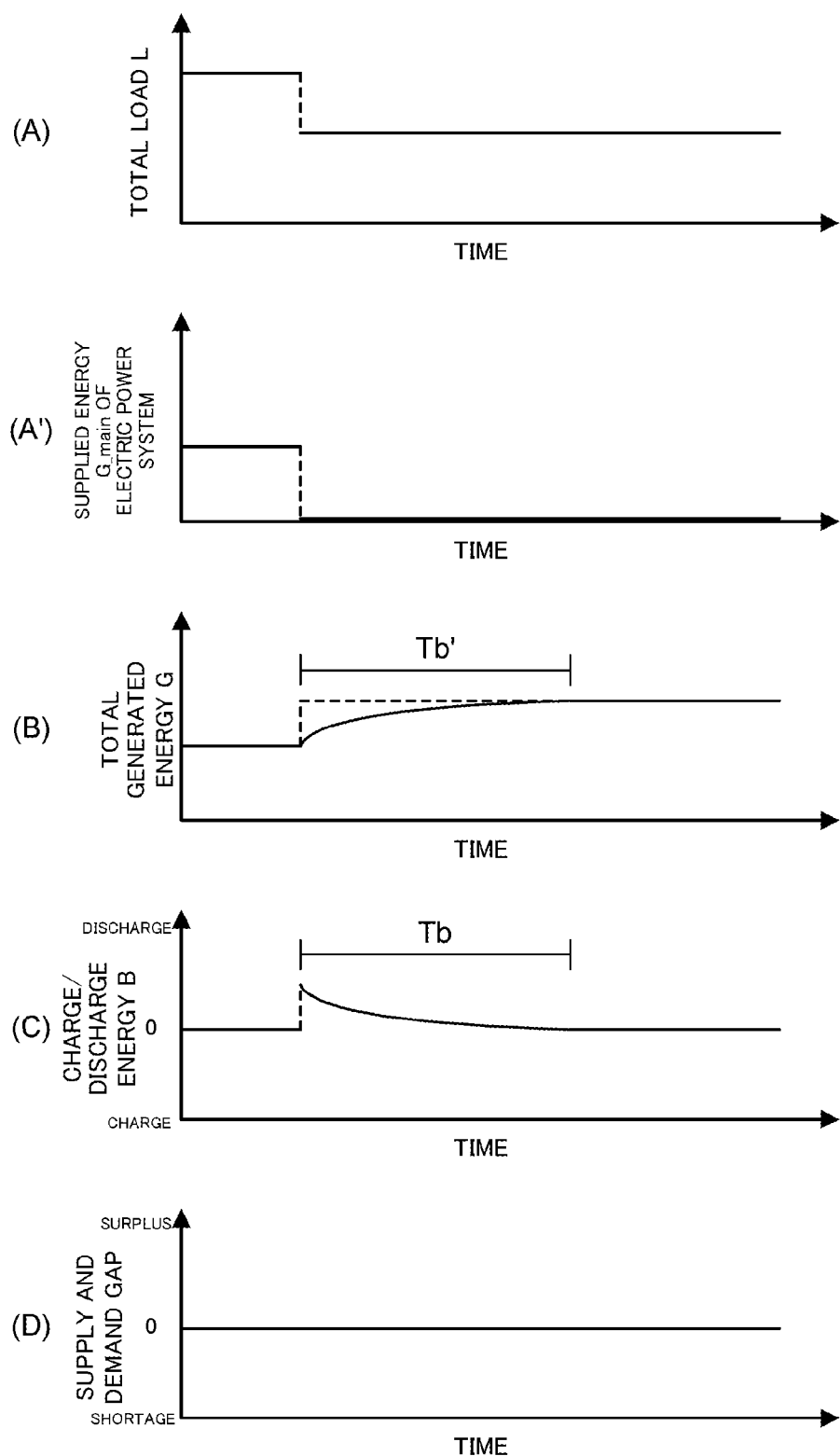

ELECTRIC POWER CONTROL SYSTEM

CROSS-REFERENCE TO RELATED APPLICATIONS

This application is a national stage application of International Application No. PCT/JP2014/001990 entitled "Electric Power Control System," filed on Apr. 7, 2014, which claims priority to Japanese Patent Application No. 2013-081353, filed on Apr. 9, 2013. The disclosures of each of which are hereby incorporated by reference in their entirety.

TECHNICAL FIELD

The present invention relates to an electric power control system. In particular, the present invention relates to an electric power control system which controls the balance between supply and demand of electric power in an electric power system.

BACKGROUND ART

A popularly employed method for controlling an electric power system is centralized control of an electric power system (for example, see Patent Document 1). Centralized control of an electric power system requires building of a mechanism for centralizing information and a large-scale control system for grasping and analyzing the whole system configuration condition and also optimizing the whole system. Such a system is easily applied in countries and regions where electric power supply infrastructure has developed to some extent, because the system can be built additionally. However, new building of the above system in regions including emerging countries where electric power infrastructure has not developed requires a large investment in development of the infrastructure.

On the other hand, in terms of optimization of the whole system, there is a proposed approach of distributed control, which is less efficient but allows electric power control without a large investment by regulating voltages between neighboring power plants or comparatively near power plants (for example, see Patent Document 2). In control of an electric power system, generally, matrix calculation is carried out on the basis of information of each generator, and a solution is found. In the case of concentrated control mentioned above, large-scale matrix calculation should be done because all the information is included. On the other hand, in the case of distributed control, sparse matrix calculation is done because control between neighboring or near power plants is executed, and therefore, the amount of calculation is considerably less.

In recent years, in consideration of the protection of global environment and energy security, natural energy such as solar light, biomass and wind power has been introduced worldwide. However, such natural energy has a problem with the stability of supply and, as such power sources become more popular in the future, it will become a critical issue how to keep the stability of the whole electric power network. In other words, when it comes to electric power generation by natural energy, new entrants to electric power supply increase because the introduction cost is low though the power generation capacity of each generator is small, and moreover, it is worried about that enough reserves cannot be secured in a small-scale electric power system configured mostly by such generators. When electric power supply from a system stops (blackout), a diesel generator may be used as a backup. However, in most cases, the diesel generator does not interconnect with the system, and this is not an idea of efficiently using distributed energy resources at all times.

As an example of the configuration of distributed control, a configuration in which a plurality of distributed energy resources are installed is disclosed in Patent Document 3. In this example, because a system with high balancing capability is connected at all times, the respective distributed energy resources can stably operate. A power distribution configuration connected to an electric power system and including distributed energy resources is shown in FIG. 1. As shown in FIG. 1, a distribution substation 1 connects to an electric power system 5, a plurality of generators 2 and a plurality of loads 4, and electric power supplied from the electric power system 5 and the generators 2 is supplied to the loads 4 and consumed thereby. When the balance between supply and demand of electric power is kept, the following equation 1 holds:

$$G\_main + \sum_{i=1}^{m} G\_i = \sum_{j=1}^{n} L\_j \quad \text{[Equation 1]}$$

where G_main denotes electric power supplied from the electric power system 5, G_i denotes electric power generated by an $i^{th}$ generator 2, L_j denotes electric power consumed by a $j^{th}$ load 4, m denotes the number of the generators 2, and n denotes the number of the loads 4.

Patent Document 1: Japanese Unexamined Patent Application Publication No. JP-A 2002-165367
Patent Document 2: Japanese Unexamined Patent Application Publication No. JP-A 2010-057311
Patent Document 3: Japanese Unexamined Patent Application Publication No. JP-A 2000-333373

Emerging countries and developing countries often face a situation that they cannot be supplied with electric power from an electric power system and, in this case, it is difficult to make a plurality of distributed energy resources stably operate while keeping the balance between supply and demand. In other words, because G_main on the left side of the equation 1 instantaneously becomes zero, generators need to balance supply and demand again, but there is a case where it is impossible to respond to sudden change or it is impossible to supply electric power consumed by all the loads in the first place. Moreover, when electric power supply from the electric power system stops or in a case where an electric power network is isolated at all times as in a remote island, high capability of balancing by the system cannot be expected.

In general, regulation of the amount of electric power generated by a generator in a short time period (from few seconds to few minutes) is autonomously executed by the generator in governor-free operation (referred to as governor control hereinafter). However, because of the failure to follow load change, it takes long time to make generators stable because there are a plurality of generators, or an unallowable abnormality in frequency and voltage occurs. In some cases, it escalates to a critical problem that a generator is disconnected, for example. In particular, when electric power supply from the electric power system stops, a great difference in supply and demand of electric power is instantaneously made, and it becomes a problem for control.

Further, in a case where real-time control is possible, a control device can send a command to each of the generators and forcibly control generated electric power in order to fill the difference between supply and demand of electric power, or can control the loads in order to limit demand. However, there is a need to install a fast and reliable communication network and a number of sensors and controlled devices, and there is a problem that installation cost is high particularly in emerging countries and developing countries. Therefore, a mechanism and control to allow a delay and an error in communication and autonomously perform stable balancing of supply and demand.

SUMMARY

An object of the present invention is to solve the above-mentioned problem that it is impossible to secure sufficient reserve in a small-scale electric power system and it is difficult to keep stability when a difference is instantaneously made between supply and demand of electric power.

An electric power control system as an aspect of the present invention includes:

an electric power supplying means for supplying electric power;

a load means for receiving supply of electric power and consuming the electric power;

an energy storing means for being charged with electric power supplied by the electric power supplying means or discharging electric power to be supplied to the load means;

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged;

an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means; and a supplied energy controlling means for executing control to change electric power supplied by the electric power supplying means over a response time corresponding to a set time constant for electric power supplying means so that the electric power supply and demand difference is kept within the preset given range.

The time constant for energy storing means is set to be longer than the time constant for electric power supplying means.

Further, an electric power control device as another aspect of the present invention is an electric power control device connected to an electric power supplying means for supplying electric power, a load means for receiving supply of electric power and consuming the electric power, and an energy storing means for being charged with electric power supplied by the electric power supplying means or discharging electric power to be supplied to the load means.

The electric power control device includes:

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged; and an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means.

In a case where the electric power supplying means includes a supplied energy controlling means, the time constant for energy storing means is set to be longer than a set time constant for electric power supplying means, the supplied energy controlling means being for executing control to change electric power supplied by the electric power supplying means over a response time corresponding to the set time constant for electric power supplying means so that the electric power supply and demand difference is kept within the preset given range.

Further, a program as another aspect of the present invention is a computer program including instructions for causing an electric power control device, which is connected to an electric power supplying means for supplying electric power, a load means for receiving supply of electric power and consuming the electric power, and an energy storing means for being charged with electric power supplied by the electric power supplying means or discharging electric power to be supplied to the load means, to realize:

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged; and an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means.

In a case where the electric power supplying means includes a supplied energy controlling means, the time constant for energy storing means is set to be longer than a set time constant for electric power supplying means, the supplied energy controlling means being for executing control to change electric power supplied by the electric power supplying means over a response time corresponding to the set time constant for electric power supplying means so that the electric power supply and demand difference is kept within the preset given range.

Further, an electric power control method as another aspect of the present invention is an electric power control method for controlling electric power of an electric power supplying means for supplying electric power, a load means for receiving supply of electric power and consuming the electric power, and an energy storing means for being charged with electric power supplied by the electric power supplying means or discharging electric power to be supplied to the load means.

The electric power control method includes:

acquiring a total supplied energy which is a total of electric power supplied by the electric power supplying means and electric power discharged by the energy storing means, and a total consumed energy which is a total of electric power consumed by the load means and electric power with which the energy storing means is charged;

when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means; and executing control to change electric power supplied by the electric power supplying means over a response time corresponding to the set time constant for electric power supplying means so that the electric power supply and demand difference is kept within the preset given range.

The time constant for energy storing means is set to be longer than a set time constant for electric power supplying means.

With the configurations as described above, the present invention makes it possible to keep stability even when a large difference of supply and demand of electric power is instantaneously made in a small-scale electric power system.

BRIEF DESCRIPTION OF DRAWINGS

FIG. 10 is a block diagram showing a configuration of an electric power control system according to a third exemplary embodiment of the present invention;

FIG. 11 is a flowchart showing operation of a control device disclosed in FIG. 10;

FIG. 12 is a flowchart showing operation of the control device disclosed in FIG. 10; and FIGS. 13A to 13D are diagrams showing an appearance during operation of the electric power control system disclosed in FIG. 10.

EXEMPLARY EMBODIMENTS

<First Exemplary Embodiment>

Figure 1:
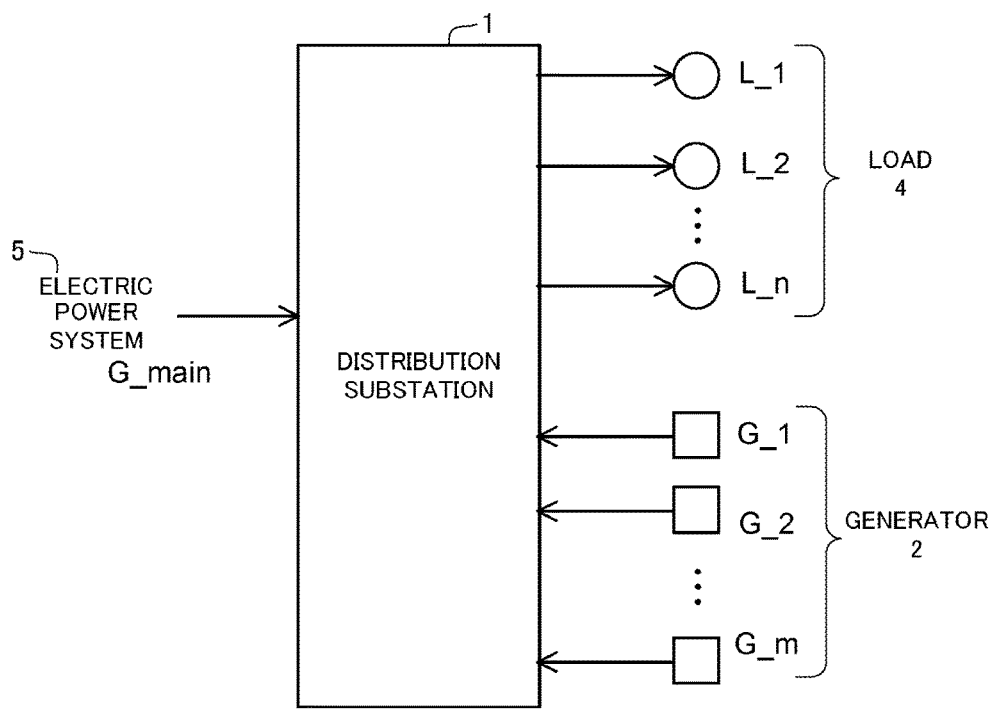
FIG. 1 is a block diagram showing an overall configuration of an electric power control system relating to the present invention.
Figure 2:
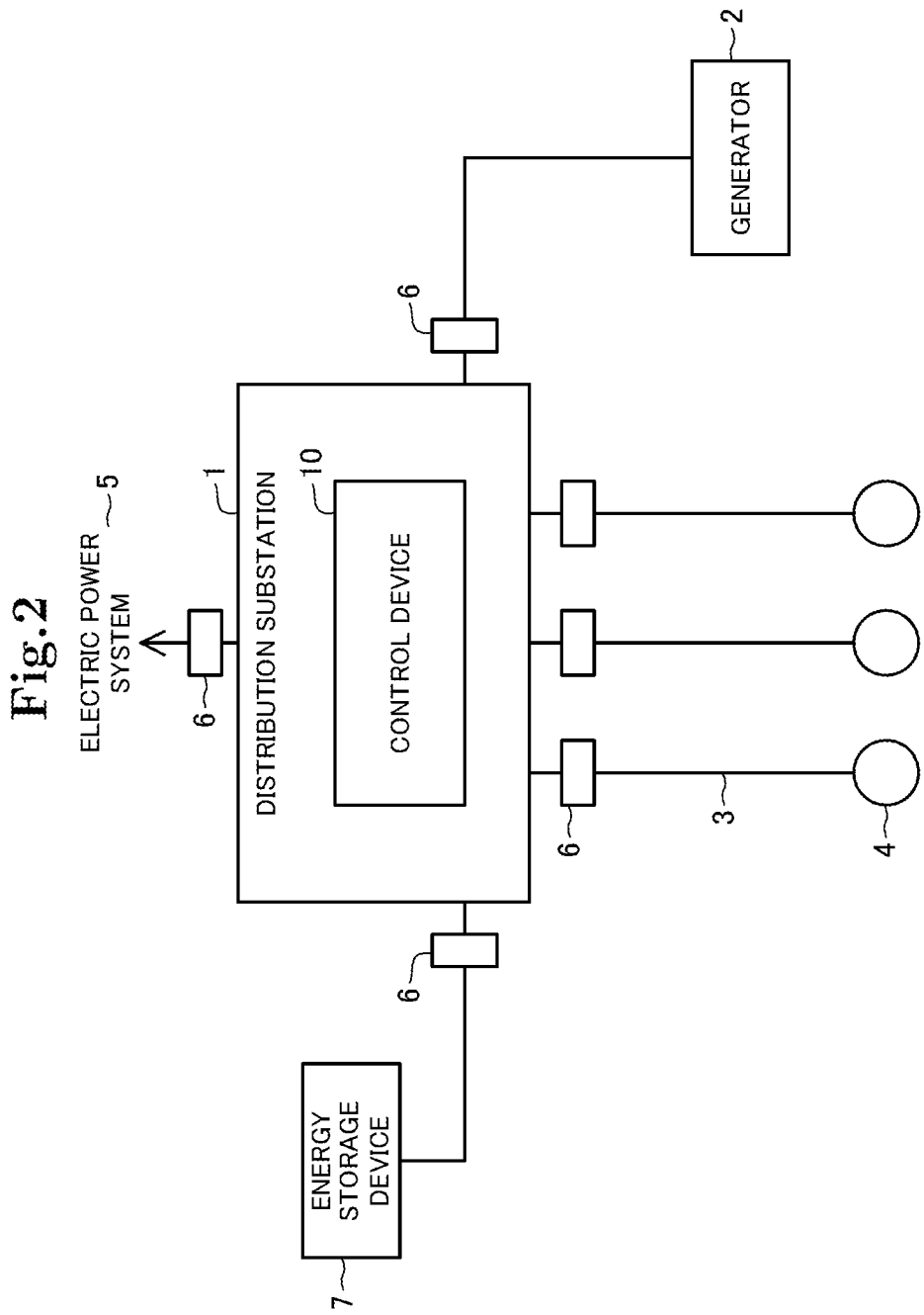
FIG. 2 is a block diagram showing an overall configuration of an electric power control system according to a first exemplary embodiment of the present invention.
Figure 3:
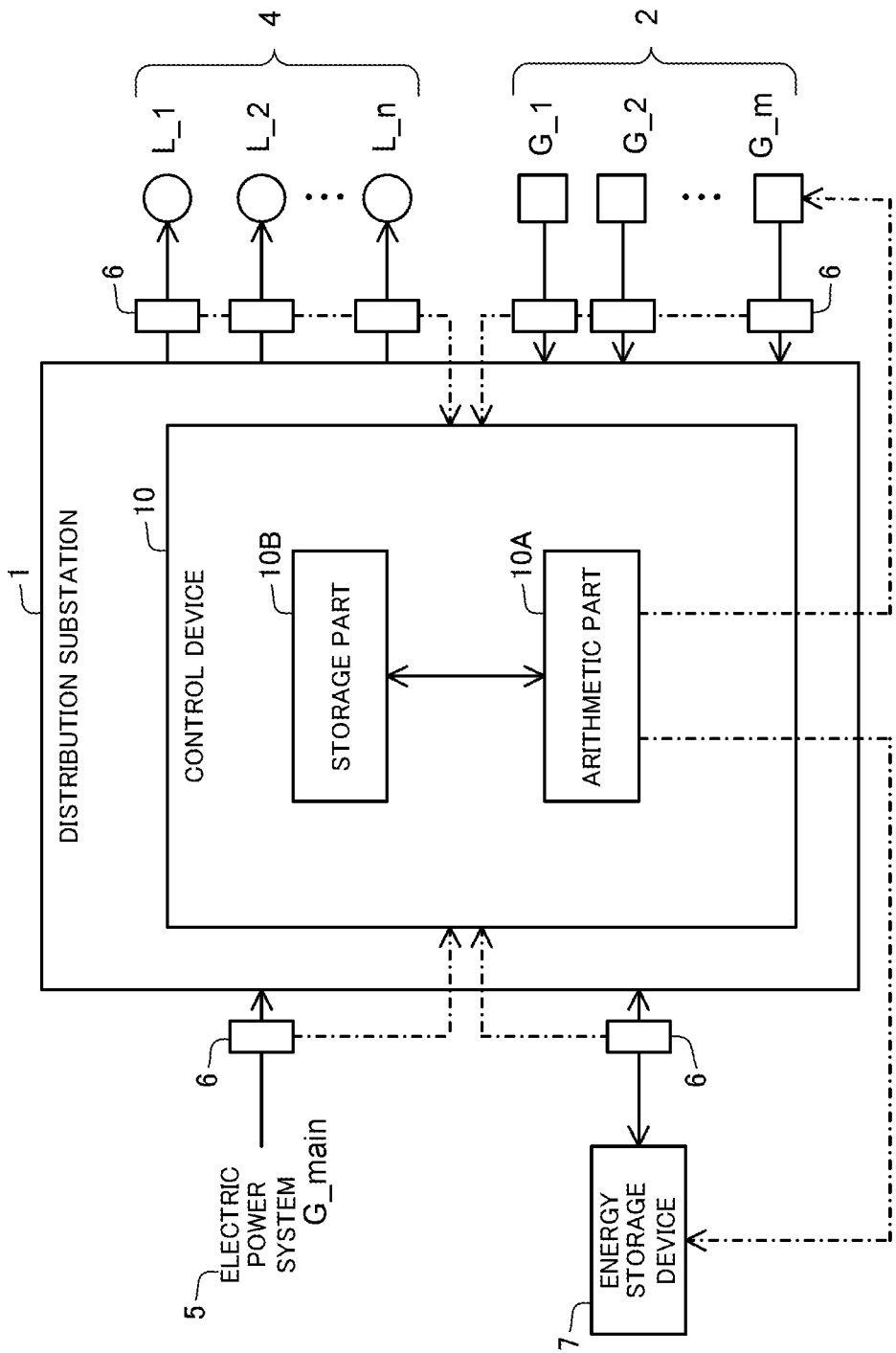
FIG. 3 is a block diagram showing a detailed configuration of the electric power control system disclosed in FIG. 2.
Figure 4:
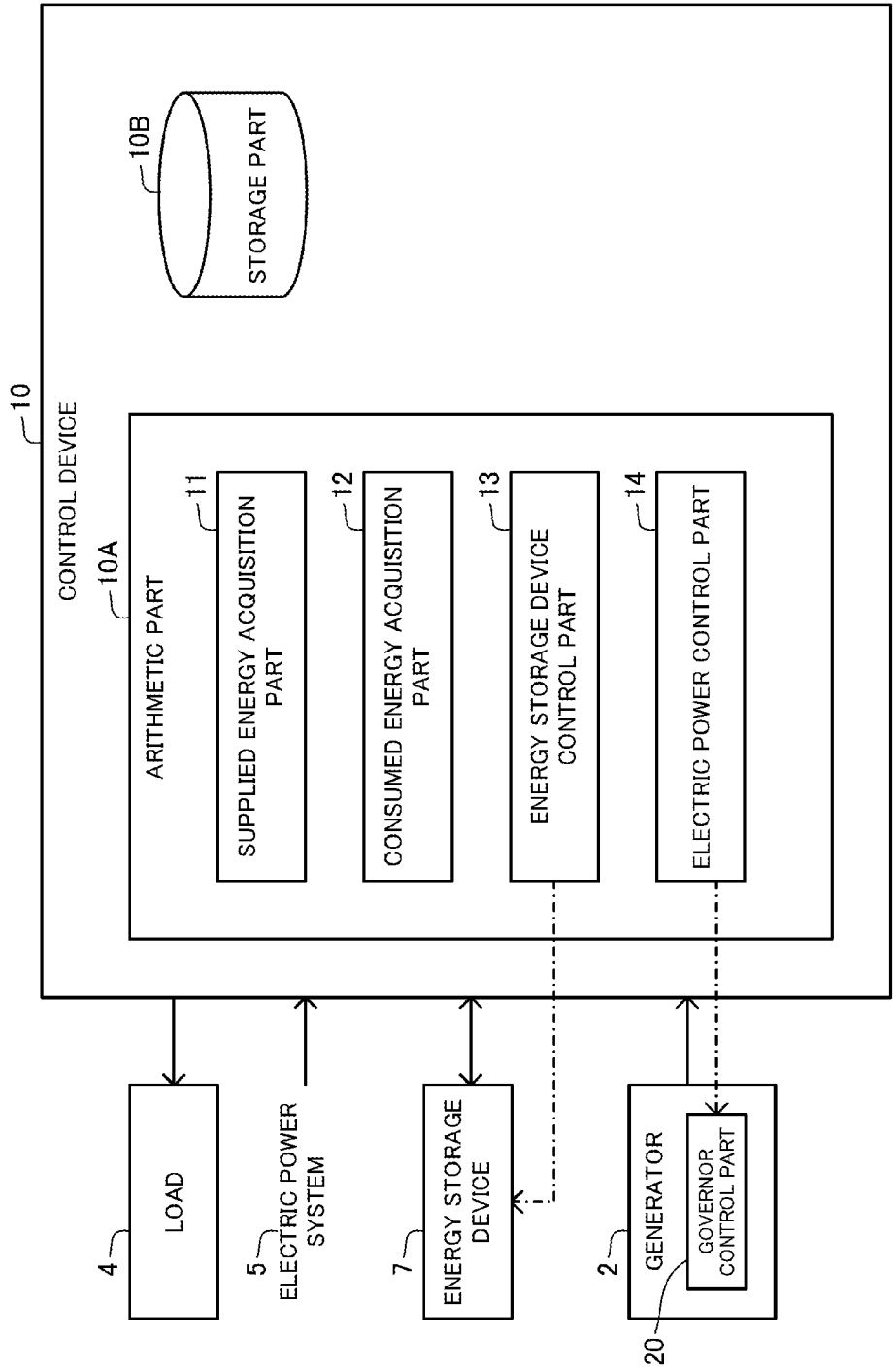
FIG. 4 is a block diagram showing a configuration of a control device disclosed in FIG. 3.

A first exemplary embodiment of the present invention will be described referring to FIGS. 2 to 8. FIGS. 2 to 4 are diagrams for describing a configuration of an electric power control system, and FIGS. 5 to 8 are diagrams for describing operation thereof.

As shown in FIGS. 2 and 3, an electric power control system according to the present invention is a system which controls electric power in an electric power system 5, and is built in a distribution substation 1 connected with the electric power system 5. The distribution substation 1 connects to one or a plurality of generators 2 which generate and supply electric power. Thus, the distribution substation 1 is supplied with a given amount of electric power from the electric power system 5, and is also supplied with electric power generated by the generators 2. In other words, the electric power system 5 and the one or plurality of generators 2 each function as an electric power supplying means which supplies electric power. As shown in FIGS. 2 and 3, on each of the lines between the generators 2 and the distribution substation 1 and between the electric power system 5 and the distribution substation 1, an electric power measuring instrument 6 such as a wattmeter which measures a supplied energy as the amount of supplied electric power is connected.

Further, the distribution station 1 connects to one or a plurality of loads 4 (load means) which receive and consume electric power. As shown in FIG. 2, the one or plurality of loads 4 are one or a plurality of demanders (consumers) connected via a distribution line 3 in general. The loads 4 each connect to the distribution substation 1 via the distribution line 3, and the electric power measuring instrument 6 such as a wattmeter which measures a load change of the connected load 4, that is, measures a consumed energy of the connected load 4 is connected on the distribution line 3.

Furthermore, the distribution substation 1 connects to an energy storage device 7 (an energy storing means). The energy storage device 7 is charged with electric power supplied from the electric power system 5 and the generators 2 and discharges electric power to be supplied to the loads 4 in the distribution substation 1. On a line between the energy storage device 7 and the distribution substation 1, the electric power measuring instrument 6 such as a wattmeter which measures the amount of charge or discharge electric power is connected.

The numbers of the generators 2, the loads 4 and the energy storage devices 7 described above are not limited to the numbers shown in FIG. 2 or 3, and any numbers of generators 2, loads 4 and energy storage devices 7 may connect to the distribution substation 1. Moreover, in the above description, the electric power measuring instruments 6 are installed on the respective lines, but the electric power measuring instruments 6 may be installed within the distribution substation, the generators, the loads, the energy storage device or the like, or may be installed in any places.

Further, the distribution substation 1 includes a control device 10 which forms an electric power control system controlling electric power. As shown in FIG. 3, the control device 10 is formed by an information processing device which includes an arithmetic device 10A and a storage device 10B. The control device 10 connects to the electric power system 5, the generators 2, the loads 4 and the energy storage device 7 described above.

To be specific, as shown in FIG. 4, the control device 10 includes a supplied energy acquisition part 11, a consumed energy acquisition part 12, an energy storage device control part 13 and an electric power control part 14 which are structured by installation of a program into the arithmetic part 10A. The storage part 10B stores information necessary in arithmetic processing by the respective parts 11 to 14. Below, the respective components will be described in detail.

The supplied energy acquisition part 11 (a total supplied energy acquiring means) acquires a supplied energy which is the amount of electric power generated by each of the generators 2 and a supplied energy which is the amount of electric power supplied from the electric power system 5, and stores them into the storage part 10B. For example, the supplied energy acquisition part 11 may acquire the amounts of electric power actually generated by the generators 2 and the amount of electric power actually supplied from the electric power system 5 by measuring with the electric power measuring instruments 6. Alternatively, with information of the amount of generated power preset for each of the generators 2 and a supplied energy of the electric power system 5 stored in advance in the storage part 10B or the like, the supplied energy acquisition part 11 may acquire the information. A method by which the supplied energy acquisition part 11 acquires a supplied energy is not limited to the abovementioned methods.

Further, the supplied energy acquisition part 11 acquires the amount of electric power discharged by the energy storage device 7 as a supplied energy by reading a value measured by the electric power measuring instrument 6 connected to the energy storage device 7, and stores it into the storage part 10B. Then, the supplied energy acquisition part 11 calculates a total supplied energy that is the total of the supplied energies of all the generators 2, the supplied energy of the electric power system 5 and the supplied energy of the energy storage device 7. Acquisition of the respective supplied energies and calculation of the total supplied energy by the supplied energy acquisition part 11 is performed at constant time intervals at all times.

A charge energy or discharge energy of the energy storage device 7 may be acquired by measuring the amounts of electric power inputted into and outputted from the energy storage device 7, or may be acquired by inputting an energy measured by a measurement device (not shown in the drawings) additionally built in the energy storage device 7, into the control device 10 via a communicating means (not shown in the drawings).

The consumed energy acquisition part 12 (a total consumed energy acquiring means) reads a value measured by the electric power measuring instrument 6 connected to each of the loads 4 to acquire a consumed energy of the load 4, and stores it into the storage part 10B. The consumed energy acquisition part 12 may acquire a value measured by another configuration mounted in the distribution substation 1 as a consumed energy, or may acquire by another method.

Further, the consumed energy acquisition part 12 reads a value measured by the electric power measuring instrument 6 connected to the energy storage device 7 to acquire the amount of power put into the energy storage device 7 as a consumed energy, and stores it into the storage part 10B. Then, the consumed energy acquisition part 12 calculates a total consumed energy that is the total of the consumed energies of all the loads 4 and the consumed energy of the energy storage device 7. Acquisition of the respective consumed energies and calculation of the total consumed energy by the consumed energy acquisition part 12 is performed at constant time intervals at all times.

Then, the control device 10 calculates an electric power supply and demand difference that is the difference between the total supplied energy and the total consumed energy calculated as described above and, depending on the value, causes the energy storage device control part 13 (an energy storage controlling means) and the electric power control part 14 (a supplied energy controlling means) to execute electric power control.

When an electric power supply and demand difference exceeds a given range set in advance, that is, when the balance between the total supplied energy and the total consumed energy is largely lost, the energy storage device control part 13 immediately controls the electric power control device 7 to charge or discharge enough to compensate for the difference. Consequently, the electric power supply and demand difference falls within the given range; for example, the electric power supply and demand difference becomes 0. After that, the energy storage device control part 13 executes control to gradually decrease the charge energy or discharge energy of the energy storage device 7 to a given value (for example, 0) over a response time corresponding to a time constant (Tb) preset for energy storage control (for the energy storing means).

The generators 2 each include a governor control part 20 (a supplied energy controlling means) having a function of executing governor-free operation of regulating the amount of generated power depending on an electric power supply and demand difference in the distribution substation 1. Therefore, the generators 2 each follow an electric power supply and demand difference in the distribution substation 1, namely, an electric power supply and demand difference associated with decrease of the charge or discharge energy of the energy storage device 7 as described above, so that the amount of generated power is autonomously regulated so as to fill the difference. For example, the governor control part 20 included by the generator 2 executes governor control such as detecting a frequency change associated with an electric power supply and demand difference in the distribution substation 1 and regulating the amount of generated power by increasing or decreasing in accordance with the frequency change. Meanwhile, the electric power control part 14 of the control device 10 described above may calculate an electric power supply and demand difference after control of charge or discharge by the energy storage device control part 13 and notify the electric power supply and demand difference to the respective generators 2, and the generators 2 may each follow the notified electric power supply and demand difference and regulate the amount of generated power so as to fill the difference.

Regulation of the amount of power generated by each of the generators 2 described above is performed over a response time corresponding to a time constant (Tg) for generator (the electric power supplying means) preset for each of the generators 2, and the time constant (Tg) is set to be shorter than the time constant (Tb) for energy storage control described above. Consequently, an electric power supply and demand difference associated with decrease of a charge or discharge energy of the energy storage device 7 is moderately followed and filled by the generators 2, and it is possible to keep the balance of an electric power supply and demand difference at all times.

In the above description, regulation of the amount of generated power is executed by the governor control part 20 installed in each of the generators 2, but the regulation is not limited to this necessarily. For example, the amount of power generated by each of the generators 2 may be controlled by the electric power control part 14.

Figure 5:
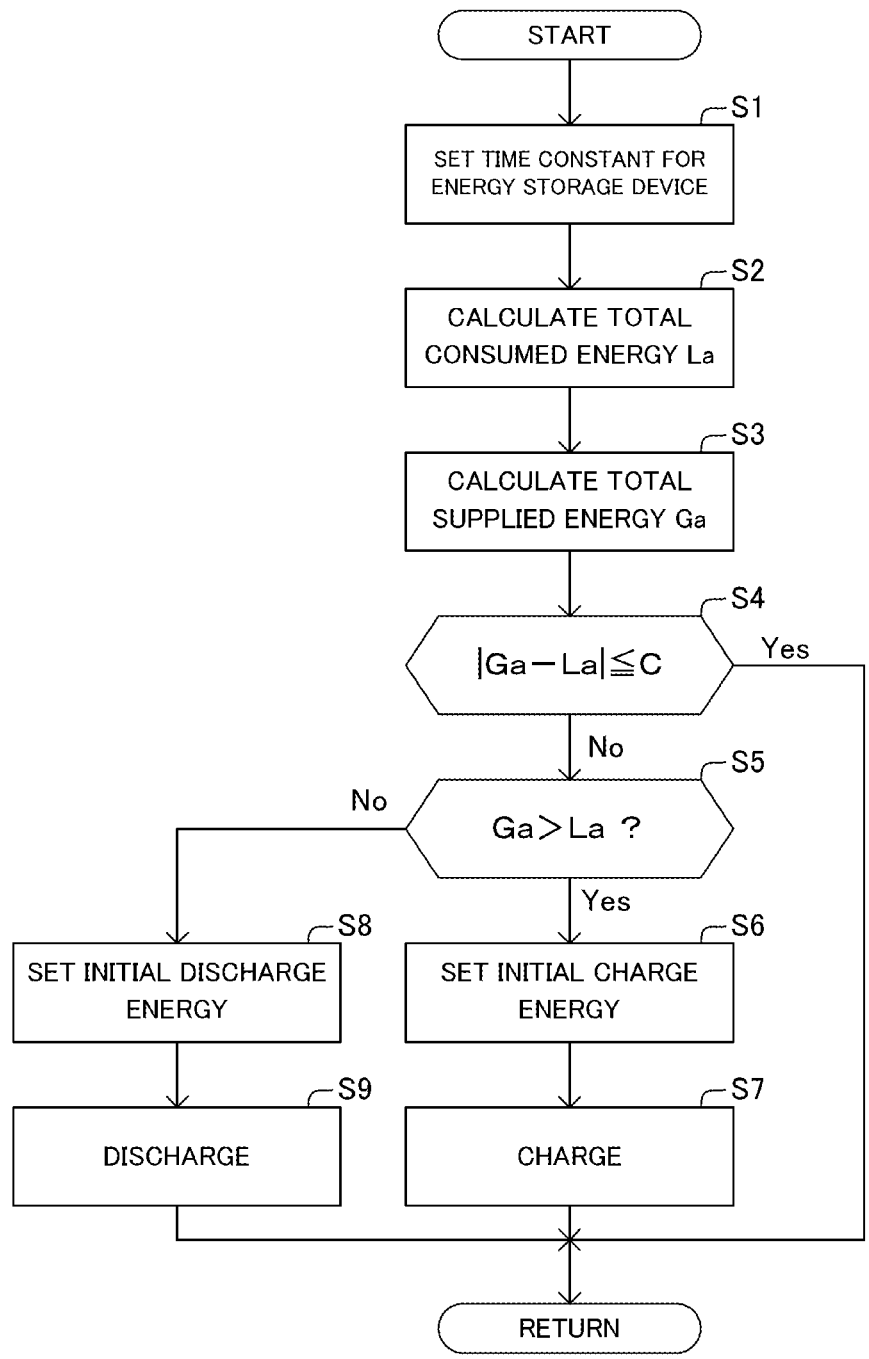
FIG. 5 is a flowchart showing operation of the control device disclosed in FIG. 3.

Next, specific operation of the electric power control system having the configuration shown above will be described referring to a flowchart of FIG. 5 and graphs showing change of energy of FIGS. 6 to 8.

First, the generators 2 each include a governor control function (the governor control part 20) that performs short-term regulation of power generation as described above, and the time constant (Tg) for the generator is mechanically or electronically set in advance. The control device 10 acquires the value of the time constant (Tg) set for each of the generators 2, and sets the value of a time constant (Tb: Tb>Tg) which is larger than the abovementioned value, for the energy storage device 7 (step S1). Meanwhile, for the energy storage device 7, the value of the time constant (Tb) may be set in advance so as to satisfy Tb>Tg.

Subsequently, the control device 10 calculates a total supplied energy Ga and a total consumed energy La. As the total consumed energy La, the control device 10 calculates the total of energies consumed by all the loads 4 (step S2). As the total supplied energy Ga, the control device 10 calculates the total of energies supplied by all the generators 2 and the electric power system 5 (step S3).

At this moment, the energy storage device 7 has not been charged or discharged. Therefore, an energy resulting from charging or discharging the energy storage device 7 is not added to the total consumed energy La or the total supplied energy Ga.

The total consumed energy La and the total supplied energy Ga are calculated with Equation 2:

$$La = \sum_{j=1}^{n} L\_j + \text{charge energy}$$
$$Ga = G\_main + \sum_{i=1}^{m} G\_i + \text{discharge energy}$$

[Equation 2]

where "G_main" denotes electric power supplied from the electric power system 5, "G_i" denotes the amount of energy generated by an $i^{th}$ generator 2, "L_j" denotes electric power consumed by a $j^{th}$ load 4, "m" denotes the number of the generators 2, and "n" denotes the number of the loads 4. Moreover, "a charge energy" and "a discharge energy" are the amounts of electric power of charge and discharge of the energy storage device 7, respectively.

Subsequently, the control device 10 obtains the difference between the total supplied energy Ga and the total consumed energy La calculated as described above (an electric power supply and demand difference), and determines whether the difference is beyond a given electric power variation allowance C set in advance (|Ga−La|≤C) (step S4). Then, in a case where the difference between the total supplied energy Ga and the total consumed energy La is beyond the electric power variation allowance C (|Ga−La|>C) (step S4: No), the control device 10 controls the energy storage device 7 to be charged or discharged.

Then, in a case where the total supplied energy Ga is larger than the total consumed energy La (Ga>La) (step S5: Yes), the control device 10 sets an initial charge energy of the energy storage device 7 to, for example, (Ga−La) (step S6), and starts charge of the energy storage device 7 (step S7). Then, the control device 10 keeps the charge while decreasing the charge energy so that the charge energy changes from the initial charge energy to 0 over a response time corresponding to the time constant (Tb) set as described above.

On the other hand, in a case where the total supplied energy Ga is smaller than the total consumed energy La (La>Ga) (step S5: No), the control device 10 sets an initial discharge energy of the energy storage device 7 to, for example, (La−Ga) (step S8), and starts discharge of the energy storage device 7 (step S9). Then, the control device 10 keeps the discharge while decreasing the discharge energy so that the discharge energy changes from the initial discharge energy to 0 over a response time corresponding to the time constant (Tb) set as described above.

Now the appearance of the energies at the time of control of charge or discharge of the energy storage device 7 as stated above will be described. Firstly, FIGS. 6A to 6D show an example of a case where electric power is not or cannot be supplied from the electric power system 5. In FIGS. 6 to 8 to be described below, the total of consumed energies of the loads 4 of a total consumed energy is expressed as a total load L, and the total of supplied energies of the generators 2 is expressed as a total generated energy G.

When the total load L significantly decreases suddenly for any cause as shown in FIG. 6A, charge of the energy storage device 7 is started so as to fill the change. In other words, because there is a surplus of a generated energy that is a supplied energy due to decrease of the total load L, charge of the energy storage device 7 is performed so as to absorb the surplus of the generated energy. At the time of charge, a charge energy is set so that an energy equivalent to the significant decrease of the total load L is an initial charge energy as shown in FIG. 6C, for example. Consequently, an electric power supply and demand difference remains 0 as shown in FIG. 6D. After that, the charge energy of the energy storage device 7 gradually decreases so as to change from the initial charge energy to 0 over the time constant Tb as shown in FIG. 6C.

Because the total consumed energy La in the distribution substation 1 at this moment includes the charge energy of the energy storage device 7, a decrease amount of the charge energy of the energy storage device 7 becomes the electric power supply and demand difference. Thus, the generators 2 are controlled by governor control to decrease generated energies so as to fill the electric power supply and demand difference. Because the time constant (Tg) of the generators 2 is shorter than the time constant (Tb) of the energy storage device 7 corresponding to the decreasing speed of the charge energy, the generators 2 operate so as to gradually decrease generated energies while following the gradually decreasing charge energy as shown in FIG. 6B.

Now the appearance of change of the energies in an electric power control system which does not include a configuration controlling the energy storage device 7 unlike in this exemplary embodiment is shown in FIGS. 8A to 8D. In this example, with significant decrease of the total load L, the electric power supply and demand difference suddenly changes as shown in FIG. 8C, so that control of the amounts of power generated by the generators 2 cannot properly follow the electric power supply and demand difference and the balance of electric power cannot be stabilized.

On the contrary, the electric power control system in this exemplary embodiment can keep the balance between supply and demand without causing a problem such as abnormality in frequency or voltage associated with a transitional supply and demand gap or disconnection of the generators. That is to say, the energy storage device 7 determines a time to regulate the amounts of power generated by the generators 2 while keeping the balance of supply and demand, and serves as the source of the balancing capability.

Further, FIGS. 7A to 7D show the appearance of the energies in a case where electric power supply from the electric power system 5 suddenly stops during supply of electric power from the electric power system 5 in the electric power control system of this exemplary embodiment. In this example, the total supplied energy Ga is the sum of the supplied energy G_main of the electric power system 5 and the total generated energy G which is the total of supplied energies of the generators 2.

When electric power supply from the electric power system 5 suddenly stops as shown in FIG. 7A', discharge by the energy storage device 7 is started so as to fill the change. In other words, because shortage of a supplied energy occurs due to decrease of the total supplied energy Ga, discharge by the energy storage device 7 is performed so as to compensate for the shortage of the energy. At the time of discharge, a discharge energy is set so that an energy equivalent to the decrease of the supplied energy G_main of the electric power system 5 is an initial discharge energy as shown in FIG. 7C, for example. Consequently, the electric power supply and demand difference remains 0 as shown in FIG. 7D. After that, the discharge energy of the energy storage device 7 gradually decreases so as to change from the initial discharge energy to 0 over the time constant Tb as shown in FIG. 7C.

Because the total supplied energy Ga in the distribution substation 1 at this moment includes a discharge energy of the energy storage device 7, a decrease amount of the discharge energy of the energy storage device 7 becomes the electric power supply and demand difference. Then, the generators 2 are controlled by governor control to increase generated energies so as to fill the electric power supply and demand difference. Because the time constant (Tg) of the generators 2 is shorter than the time constant (Tb) of the energy storage device 7 corresponding to the decreasing speed of the charge energy, the generators 2 operate so as to gradually increase generated energies while following the gradually decreasing charge energy as shown in FIG. 7B. Such operation makes it possible to keep the balance of supply and demand stable as in the case of FIG. 6 described above.

Figure 6:
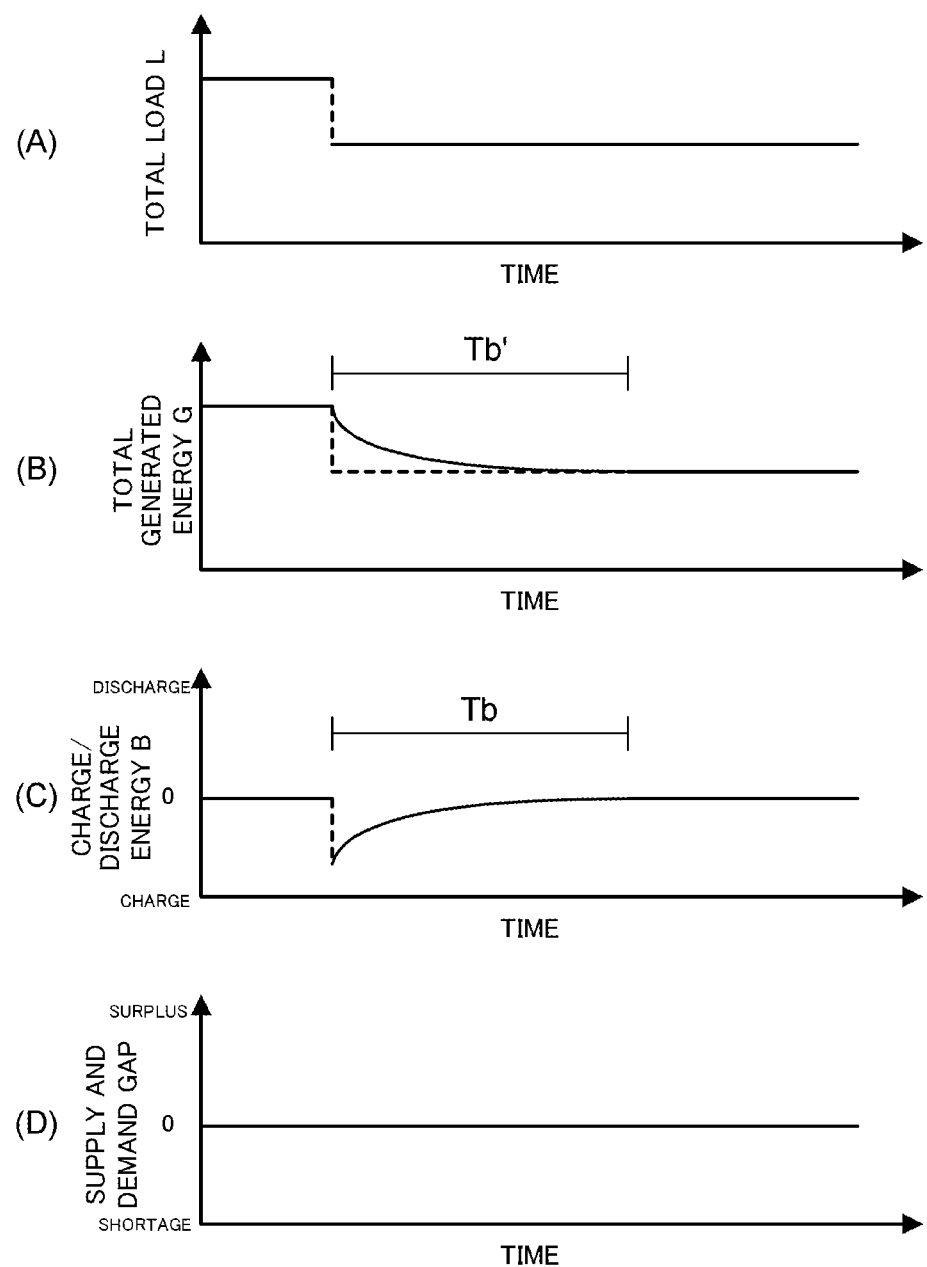
FIGS. 6A to 6D are diagrams showing an appearance during operation of the electric power control system disclosed in FIG. 3.
Figure 7:
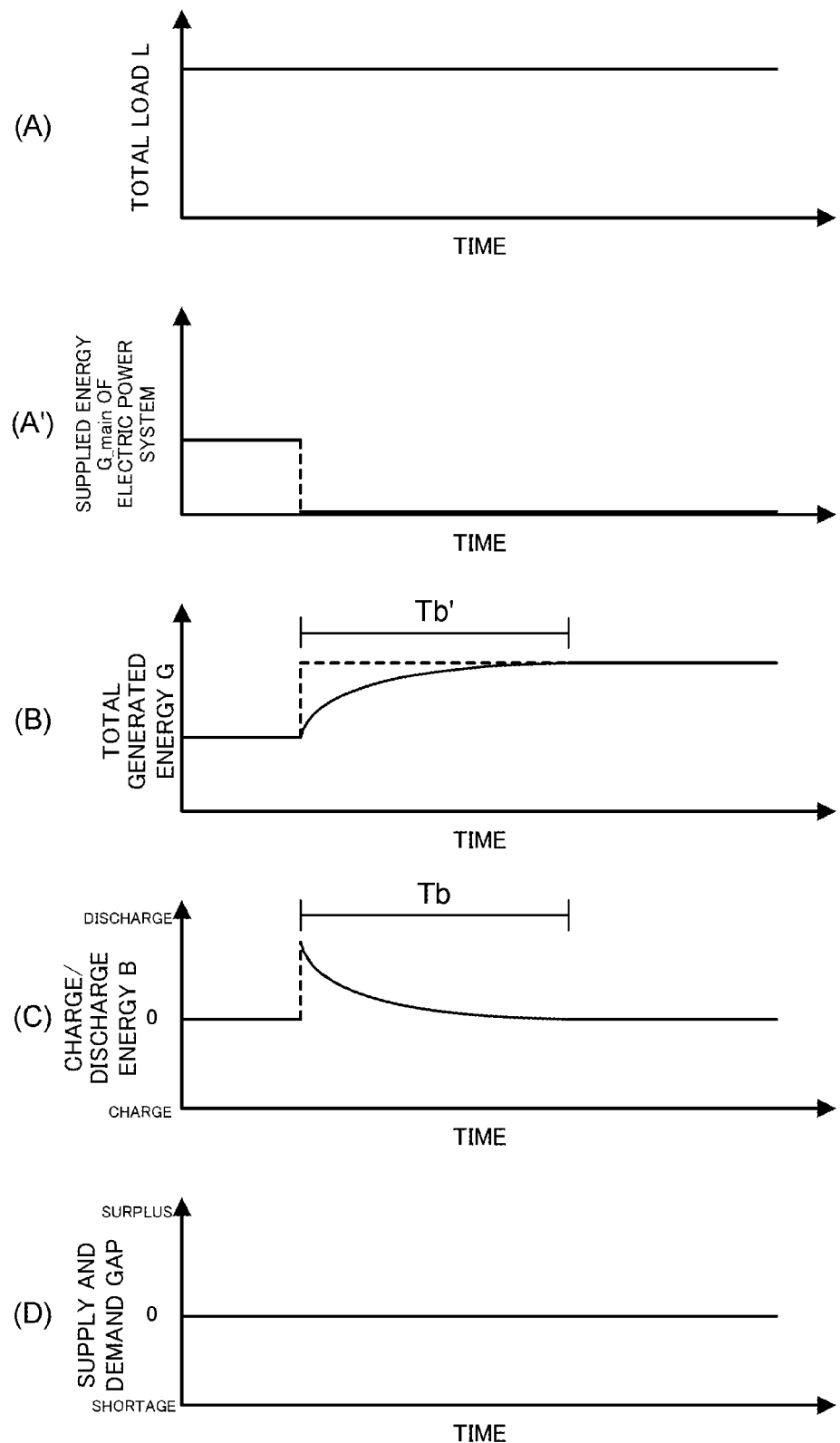
FIGS. 7A to 7D are diagrams showing an appearance during operation of the electric power control system disclosed in FIG. 3.
Figure 8:
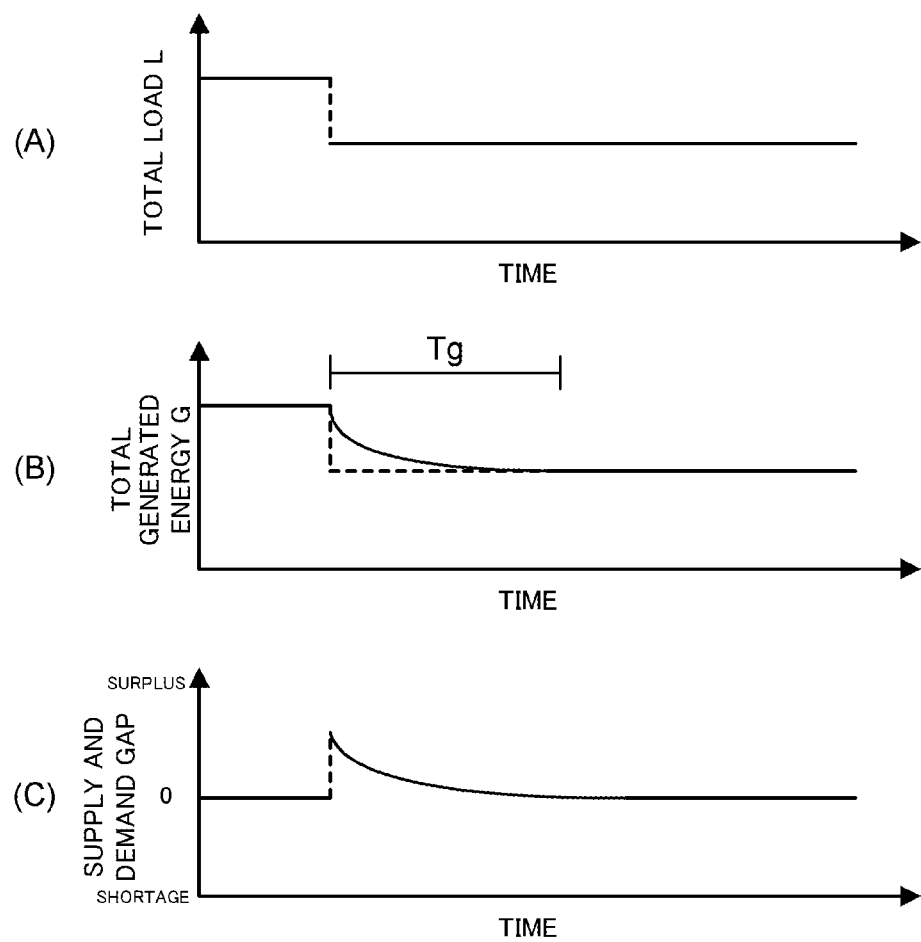
FIGS. 8A to 8C are diagrams showing an appearance during operation of the electric power control system relating to the present invention disclosed in FIG. 1.

In FIGS. 6 and 7, the time constant of the total generated energy G is expressed as Tb' because change of a generated energy follows change of a charge or discharge energy. To be exact, Tb'>Tb is satisfied, and a supply and demand gap does not become zero. However, in the case of Tg<<Tb, Tb' almost equals Tb, and a supply and demand gap can be almost zero.

Thus, in this exemplary embodiment of the present invention, the problem caused by transitional imbalance of supply and demand can be avoided with the energy storage device 7. Moreover, setting the time constants enables the generators 2 to autonomously regulate generated energies without introducing a mechanism of real-time control executed from outside between the generators 2 and the energy storage device 7, and allows stable operation of the electric power system. In addition, in setting the time constant of the energy storage device 7, it may be changed depending on the capability of the energy storage device 7, the energy stored therein, and so on.

The abovementioned "electric power variation allowance C" is a parameter which is determined on the basis of the loss of the electric power system 5 and the load variation capability of the generators 2. For example, in a case where high-loss distribution lines are included or many of the generators 2 of the distribution substation 1 need time to regulate power generation capacity, the electric power variation allowance C is set to a high value. On the other hand, in a case where the electric power system 5 is configured by low-loss distribution lines and generators 2 which are easy to regulate output, it is possible to set the electric power variation allowance C to be a low value, and it is possible to increase the efficiency of electric power generation. In addition, it is also possible to set the electric power variation allowance C to different values between when the total load L is more than the total generated energy G and when the total load L is less than the total generated energy G <Second Exemplary Embodiment>

Figure 9:
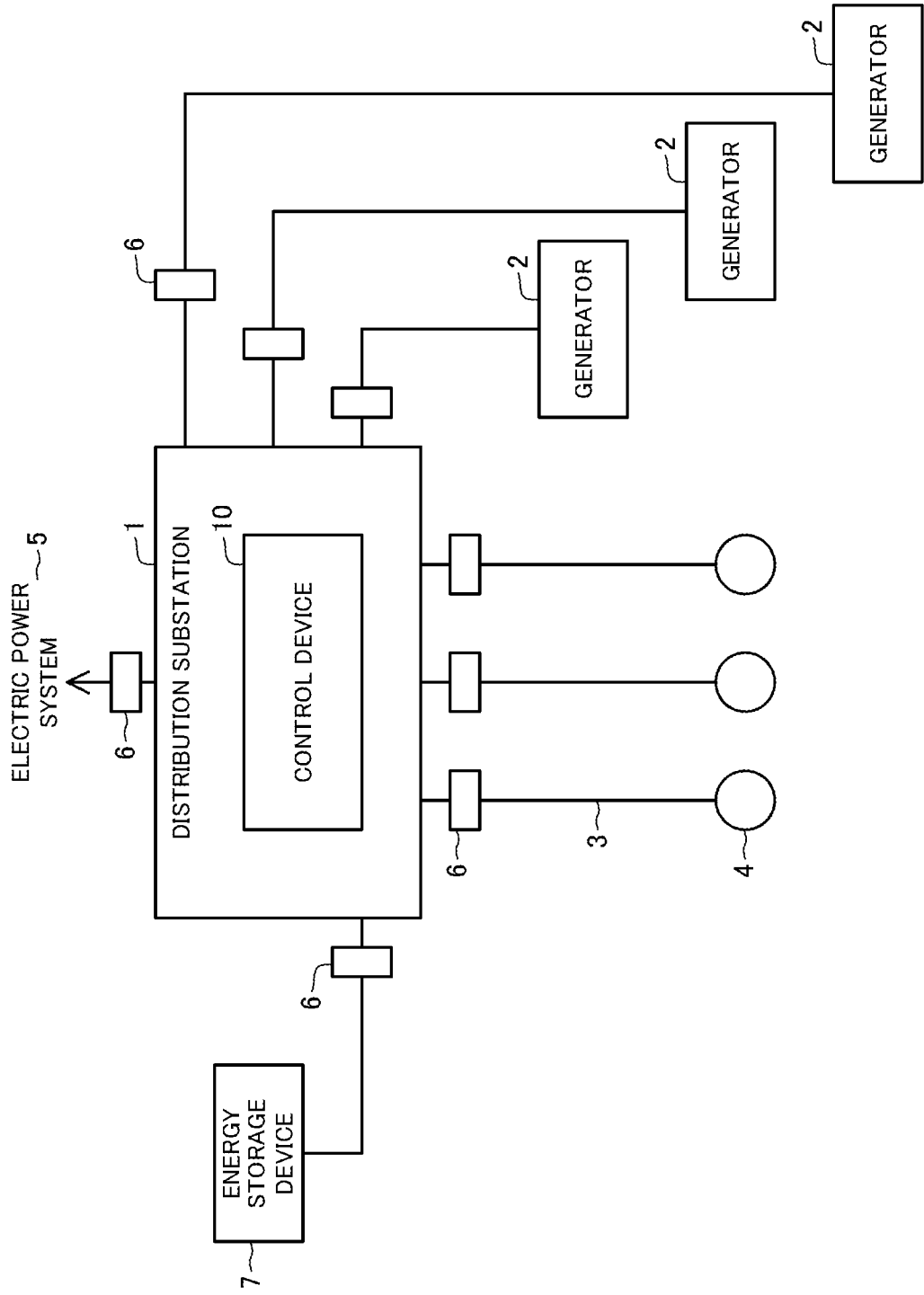
FIG. 9 is a block diagram showing a configuration of an electric power control system according to a second exemplary embodiment of the present invention.

A second exemplary embodiment of the present invention will be described referring to FIG. 9. As shown in FIG. 9, an electric power control system of this exemplary embodiment has almost the same configuration as that of the first exemplary embodiment, but includes a plurality of (for example, three) generators 2. However, the number of the generators 2 is not limited to the number shown in FIG. 9.

The generators 2 each include the abovementioned governor control function and, as the characteristic, the adjustment range of a generated energy is preset. For example, a maximum change amount, which is the range of a generated energy which can be changed per unit time, is set as the adjustment range of a generated energy. In this case, the generators 2 can each increase or decrease a generated energy so as to fill an electric power supply and demand difference per unit time in the set range of the maximum change amount. The adjustment range of a generated energy is set to different ranges depending on the electric power generation capacity or type of the generators 2.

Then, for each of the generators 2, the time constant (Tg) for execution of governor control is set as described above, and a value corresponding to the abovementioned adjustment range of the generated energy is set. For example, as a maximum change amount that is the adjustment range of the generated energy is larger, the time constant (Tg) is set to a shorter value. Consequently, a generator 2 with a large adjustment range of the generated energy (change amount of the generated energy) can follow an electric power supply and demand difference earlier and fill the electric power supply and demand difference. As a result, the generators 2 which autonomously adjust generated energies do not exchange information about power generation with each other in real time, and the generators 2 can each autonomously maximize the adjustment range of the total generated energy.

Further, the time constants (Tg) of the respective generators 2 may be set to different values, or the time constants (Tg) of all or part of the generators 2 may be set to the same value. Then, the abovementioned time constant (Tb) of the energy storage device 7 is set to be longer than the time constants (Tg) of the respective generators 2. In this case, it is good to set the time constant (Tb) of the energy storage device 7 so as to be longer than at least any of the time constants (Tg) of the generators 2 (for example, longer than the time constant (Tg) of the smallest value). In a case where the number of the generators 2 is N, it is preferred to arrange the time constants (Tg) of the respective generators 2 in increasing order and set the time constant (Tb) of the energy storage device 7 so as to a larger value than the $(N-1)^{th}$ time constant (Tg). In other words, it is favorable to set the time constant (Tb) of the energy storage device 7 so as to be longer than the time constants (Tg) of all the generators 2 except the generator 2 whose time constant (Tg) is the longest. Further, it is more favorable to set the time constant (Tb) of the energy storage device 7 so as to be longer than the time constants (Tg) for all the generators 2.

Consequently, in accordance with the longer time constant (Tb) of the energy storage device 7, adjustment of power generation of the generator 2 whose time constant (Tg) is set to be shorter than the time constant (Tb) is stably performed. Because a generator 2 for which the time constant (Tg) longer than the time constant (Tb) for the energy storage device 7 is set performs adjustment of electric power generation with the time constant (Tg) set for itself, it is possible to avoid interference of adjustment of electric power generation in the other generator 2 for which the time constant (Tg) is set to be shorter.

Further, the control device 10 in this exemplary embodiment has a time constant setting function (an electric power supplying means time constant setting means) which, for each of the generators 2, sets the abovementioned time constant (Tg) for the generator 2. For example, the time constant setting function acquires the value of the abovementioned generated energy adjustment range set in advance for each of the generators 2, and sets the time constant (Tg) depending on the adjustable range for the generator 2. Alternatively, the time constant setting function may acquire the power generation conditions of the respective generators 2 and the states of the loads 4, and dynamically set the time constants (Tg) on the basis of such information. Accordingly, the control device 10 properly sets and updates the time constants of the generators 2, whereby it is possible, for example, to maximize the adjustment width of the total generated energy in governor control, and dynamically control time to stabilize.

<Third Exemplary Embodiment>

A third exemplary embodiment of the present invention will be described referring to FIGS. 10 to 13. FIG. 10 is a diagram for describing a configuration of an electric power control system, and FIGS. 11 to 13 are diagrams for describing operation thereof As shown in FIG. 10, the electric power control system of this exemplary embodiment has almost the same configuration as the system of the first exemplary embodiment, but includes a plurality of (for example, four) loads 41 to 44. The number of the loads is not limited to the number shown in FIG. 10.

The control device 10 in this exemplary embodiment has the configuration shown in FIG. 4 described in the first exemplary embodiment. In this configuration, the electric power control part 14 (a supply and demand condition controlling means) has a function of stopping electric power supply to part of the loads 4 depending on the condition of electric power supply and demand (for example, in a case where electric power supply from the electric power system 5 stops and |Ga−La|≤C is satisfied). Then, after stopping electric power supply to part of the loads 4, in the same manner as mentioned above, the electric power control part 14 notifies the calculated electric power supply and demand difference to the respective generators 2 and causes them to execute governor control of generated energies. Meanwhile, the electric power control part 14 may previously select some load 4 to which it stops electric power supply, on the basis of the conditions for stopping electric power supply to part of the loads 4, such as stoppage of electric power supply from the electric power system 5, the amount of power which can be generated by the generators 2, and the amounts of power consumed by the loads.

Further, depending on an electric power supply and demand difference after stoppage of electric power supply to part of the loads 4 as described above, the energy storage device control part 13 in this exemplary embodiment controls the energy storage device 7 to be charged with or discharge electric power of an initial energy which secures the electric power supply and demand difference. After that, in the same manner as described above, control is performed so that a charge energy or a discharge energy gradually decreases over the time constant (Tb) set for the energy storage device 7.

The energy storage device control part 13 has a function of, in a case where some load 4 to which it stops electric power supply is preset as described above, presetting an initial charge or discharge energy of the energy storage device 7 on the basis of the conditions for stopping electric power supply to some load 4, the amounts of power that can be generated by the generators 2, and the amounts of power consumed by remaining loads 4 to which it does not stop electric power supply.

The operation of the electric power control system will be described referring to flowcharts of FIGS. 11 and 12 and a graph of FIG. 13 showing change of the energies.

First, the control device 10 detects a generated energy G_i (where i=1m) of each of the generators 2 (step S11). Next, the control device 10 detects a load L_j (where j=1n) of each of the loads 4 (step S12).

In this exemplary embodiment, a case where electric power supply from the electric power system 5 stops and the difference between the total supplied energy and the total consumed energy becomes a given value or more shall be a condition for stopping electric power supply to part of the loads 4. Therefore, on the assumption that electric power supply from the electric power system 5 stops and electric power is supplied only from the generators 2, the control device 10 selects a load 4 (a remaining load) to which electric power can be supplied at a maximum supplied energy of the generators 2 and the other load 4 (some load) to which electric power supply is stopped (step S13). The maximum supplied energy of the generators 2 may be the sum of the generated energies detected as described above, or may be a value which is larger than the detected generated energies and can be acquired by the control device 10. Besides, in the selection, not only technical factors but also the priority of demanders and so on may be taken into consideration.

Subsequently, the control device 10 calculates the value of the following expression 3, where the sum of the remaining loads selected as described above (step S14):

$$\sum_{i=1}^{m} G\_i - Lr \qquad \text{[Expression 3]}$$

This value represents an electric power supply and demand difference made when electric power supply from the electric power system 5 stops and electric power generated by the generators 2 is supplied to only the remaining loads 4. Therefore, in a case where the value of the expression 3 is "positive," an energy equivalent to the value of the expression 3 is a surplus. Thus, in a case where the value of the expression 3 is "positive," the control device 10 presets the value of the expression 3 to an initial charge energy of the energy storage device 7 (step S15). On the other hand, in a case where the value of the expression 3 is "negative," electric power supplied to the other loads 4 is insufficient, so that the control device 10 sets the value of the equation 3 to an initial discharge energy of the energy storage device 7.

Further, in the same manner as described above, the control device 10 sets the time constant (Tb) of the energy storage device 7 so as to be larger than the time constant (Tg) of the generators 2 (step S16). By properly updating the initial energies and the time constants, it is possible to keep the latest information at any time electric power supply from the system stops.

Subsequently, a process executed when electric power supply from the electric power system 5 actually stops will be described referring to FIG. 12. The control device 10 detects stoppage of electric power supply from the electric power system 5 and, as described in the first exemplary embodiment, when an electric power supply and demand difference which is the difference between the total supplied energy and the total power load exceeds a given value (step S21: Yes), the control device 10 stops electric power supply to the some load 4 other than the remaining loads preset as described above (step S22). Then, the control device 10 controls the energy storage device 7 to be charged with or discharge electric power of the preset initial energy. After that, the control device 10 controls the operation of the energy storage device 7 so that the charge or discharge energy gradually decreases over the set time constant in the same manner as described above (step S23).

The appearance of change of the energies in the thus controlled system is shown in FIGS. 13A to 13D. Firstly, in a case where the control device 10 detects stoppage of electric power supply from the electric power system 5 as shown in FIG. 13A', electric power supply to the some load is stopped and therefore the total load L significantly decreases as shown in FIG. 13A. At this moment, discharge by the energy storage device 7 is started to keep the balance between supply and demand as shown in FIG. 13C. A discharge energy gradually decreases over the time constant (Tb), but the time constant (Tg) of the generators 2 is shorter than the time constant (Tb) of the energy storage device 7, so that a generated energy gradually decreases by governor control of the generators 2 while following the discharge energy of the energy storage device 7 as shown in FIG. 13B.

Thus, in this exemplary embodiment, even when electric power supply from the electric power system 1 stops, the previously selected loads 4 are supplied with minimum electric power from the generators 2 connected to the distribution substation 1. Then, as in the first exemplary embodiment, the problem caused by transitional imbalance of supply and demand can be avoided with the energy storage device 7. Moreover, setting the time constants enables the generators 2 to autonomously regulate generated energies without introducing a mechanism of real-time control which is executed from outside between the generators 2 and the energy storage device 7, and allows stable operation of the electric power system. In a case where electric power supply from the electric power system 5 stops long time, it is possible to reselect loads 4 to which electric power is supplied and sequentially supply electric power (for example, supply electric power in rotation).

Further, when electric power supply from the electric power system 5 is restarted, electric power is supplied to all the loads. A supply and demand gap caused in the restarting can be compensated for by charge and discharge of the energy storage device 7. An initial charge (or discharge) energy at this moment may be determined by calculation using the load at the time of stoppage of electric power supply, or may be determined on the basis of other information such as an outage time. Moreover, when electric power supply is restarted, it is also possible to select not to use the energy storage device because it is possible to utilize the balancing capability of the system.

Although a case where electric power supply from the electric power system 5 stops has been described above, the same operation may be performed also when the generators 2 are disconnected (stopped) in a state that electric power supply from the electric power system 5 stops or the electric power system 5 is not connected. Moreover, at step S15 shown in FIG. 11, an initial charge or discharge energy of the energy storage device 7 is set in advance, but it may be set after electric power supply stops. Moreover, in setting the time constant of the energy storage device 7, the time constant may be changed depending on the capacity of the energy storage device, the energy stored therein, and so on.

Although the first and second exemplary embodiments have described the configuration composed of the distribution substation 1 and the load 4, there is also a case where a distribution substation includes two levels and executes transformation two times. Also in such a case, it is possible to perform the same operation without deviating from the requirements of this exemplary embodiment.

<Supplementary Notes>

The whole or part of the exemplary embodiments disclosed above can be described as the following supplementary notes. Below, the overview of the configurations of an electric power control system, a program and an electric power control method according to the present invention will be described. However, the present invention is not limited to the following configurations.

(Supplementary Note 1)

An electric power control system comprising:

an electric power supplying means for supplying electric power;

a load means for receiving supply of electric power and consuming the electric power;

an energy storing means for being charged with electric power supplied by the electric power supplying means or discharging electric power to be supplied to the load means;

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged;

an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means; and a supplied energy controlling means for executing control to change electric power supplied by the electric power supplying means over a response time corresponding to a set time constant for electric power supplying means so that the electric power supply and demand difference is kept within the preset given range, wherein the time constant for energy storing means is set to be longer than the time constant for electric power supplying means.

(Supplementary Note 2)

The electric power control system according to Supplementary Note 1, wherein:

when the electric power supply and demand difference exceeds the preset given range, the energy storage controlling means sets an energy equivalent to the electric power supply and demand difference as an initial energy, and executes control to make the energy storing means charged with the initial energy of electric power or discharge the initial energy of electric power, and also controls the energy storing means so as to gradually decrease the charge or discharge electric power over the response time corresponding to the time constant for energy storing means so that the electric power changes from the initial energy to a given value; and the supplied energy controlling means executes control changing electric power supplied by the electric power supplying means over the response time corresponding to the time constant for electric power supplying means so that the electric power supply and demand difference is kept within the given range, the electric power supply and demand difference being made as a result that the energy storage controlling means gradually decreases a charge or discharge energy of the energy storing means.

(Supplementary Note 3)

The electric power control system according to Supplementary Note 1 or 2, wherein:

the electric power supplying means includes at least one generator; and the supplied energy controlling means executes control changing a supplied energy over the response time corresponding to the time constant for electric power supplying means set for the generator so that the electric power supply and demand difference is kept within the preset given range, the supplied energy being an amount of electric power generated by the generator.

(Supplementary Note 4)

The electric power control system according to Supplementary Note 3, wherein:

the electric power supplying means includes a plurality of generators, and time constants for electric power supplying means are set for the respective generators; and the time constant for energy storing means is set to be longer than the time constant for electric power supplying means set for at least one of the generators.

(Supplementary Note 5)

The electric power control system according to Supplementary Note 4, wherein:

the electric power supplying means includes N generators; and the time constant for energy storing means is set to be longer than a $(N-1)^{th}$ in increasing order of the time constants for electric power supplying means set for the generators.

(Supplementary Note 6)

The electric power control system according to Supplementary Note 4 or 5, wherein the time constant for electric power supplying means set for the generator is set so as to be shorter as a change amount of an amount of electric power generated by the generator, the change amount being a set characteristic, and the amount of electric power being controlled by the supplied energy controlling means is larger.

(Supplementary Note 7)

The electric power control system according to any of Supplementary Notes 4 to 6, comprising an electric power supplying means time constant setting means for setting the time constant for electric power supplying means for each of the generators.

(Supplementary Note 8)

The electric power control system according to any of Supplementary Notes 1 to 7, comprising a plurality of load means, the electric power control system comprising a supply and demand condition controlling means for controlling to stop electric power supply to some load means among the load means when the electric power supply and demand difference exceeds the preset given range, wherein the energy storage controlling means and the supplied energy controlling means operate on a basis of the electric power supply and demand difference after stoppage of electric power supply to the some load means by the supply and demand condition controlling means.

(Supplementary Note 9)

The electric power control system according to Supplementary Note 8, wherein:

the electric power supplying means includes an electric power system supplying a given energy of electric power and at least one generator;

the supply and demand condition controlling means stops electric power supply to the some load means other than one or more load means among the load means when the electric power supply and demand difference exceeds the preset given range due to stoppage of electric power supply from the electric power system, the one or more load means being capable of operating with a total of amounts of electric power which can be generated by all the generators; and the energy storage controlling means executes control to make the energy storing means charged with or discharge an initial energy of electric power, the initial energy being an energy keeping the electric power supply and demand difference within the given range, and the electric power supply and demand difference being that after stoppage of electric power supply to the some load means by the supply and demand condition controlling means.

(Supplementary Note 10)

The electric power control system according to Supplementary Note 9, wherein:

the some load means to which the supply and demand condition controlling means stops electric power supply are preset on a basis of a total of amounts of electric power which can be generated, the amounts being preset for the respective generators; and an initial energy is preset on a basis of a difference between a total of amounts of electric power generated by the generators and a total of consumed energies of the load means to which the supply and demand condition controlling means does not stop electric power supply, the initial energy being an amount of electric power which the energy storing means is charged with or discharges under control of the energy storage controlling means.

(Supplementary Note 11)

An electric power control device connected to an electric power supplying means for supplying electric power, a load means for receiving supply of electric power and consuming the electric power, and an energy storing means for being charged with electric power supplied by the electric power supplying means or discharging electric power to be supplied to the load means, the electric power control device comprising:

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged; and an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means, wherein in a case where the electric power supplying means includes a supplied energy controlling means, the time constant for energy storing means is set to be longer than a set time constant for electric power supplying means, the supplied energy controlling means being for executing control to change electric power supplied by the electric power supplying means over a response time corresponding to the set time constant for electric power supplying means so that the electric power supply and demand difference is kept within the preset given range.

(Supplementary Note 12)

The electric power control device according to Supplementary Note 11, wherein:

when the electric power supply and demand difference exceeds the preset given range, the energy storage controlling means sets an energy equivalent to the electric power supply and demand difference as an initial energy, and executes control to make the energy storing means charged with the initial energy of electric power or discharge the initial energy of electric power, and also controls the energy storing means so as to gradually decrease the charge or discharge electric power over the response time corresponding to the time constant for energy storing means so that the electric power changes from the initial energy to a given value.

(Supplementary Note 13)

A computer program comprising instructions for causing an electric power control device, which is connected to an electric power supplying means for supplying electric power, a load means for receiving supply of electric power and consuming the electric power, and an energy storing means for being charged with electric power supplied by the electric power supplying means or discharging electric power to be supplied to the load means, to realize:

a total supplied energy acquiring means for acquiring a total supplied energy, the total supplied energy being a total of electric power supplied by the electric power supplying means and electric power discharged by the energy storing means;

a total consumed energy acquiring means for acquiring a total consumed energy, the total consumed energy being a total of electric power consumed by the load means and electric power with which the energy storing means is charged; and an energy storage controlling means for, when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means, wherein in a case where the electric power supplying means includes a supplied energy controlling means, the time constant for energy storing means is set to be longer than a set time constant for electric power supplying means, the supplied energy controlling means being for executing control to change electric power supplied by the electric power supplying means over a response time corresponding to the set time constant for electric power supplying means so that the electric power supply and demand difference is kept within the preset given range.

(Supplementary Note 14)

The computer program according to Supplementary Note 13, wherein:

when the electric power supply and demand difference exceeds the preset given range, the energy storage controlling means sets an energy equivalent to the electric power supply and demand difference as an initial energy, and executes control to make the energy storing means charged with the initial energy of electric power or discharge the initial energy of electric power, and also controls the energy storing means so as to gradually decrease the charge or discharge electric power over the response time corresponding to the time constant for energy storing means so that the electric power changes from the initial energy to a given value.

(Supplementary Note 15)

An electric power control method for controlling electric power of an electric power supplying means for supplying electric power, a load means for receiving supply of electric power and consuming the electric power, and an energy storing means for being charged with electric power supplied by the electric power supplying means or discharging electric power to be supplied to the load means, the electric power control method comprising:

acquiring a total supplied energy which is a total of electric power supplied by the electric power supplying means and electric power discharged by the energy storing means, and a total consumed energy which is a total of electric power consumed by the load means and electric power with which the energy storing means is charged;

when an electric power supply and demand difference representing a difference between the total supplied energy and the total consumed energy exceeds a preset given range, making the energy storing means charged with electric power or discharge electric power, and executing control to keep the electric power supply and demand difference within the given range, and also controlling the energy storing means so as to decrease the charge or discharge electric power over a response time corresponding to a set time constant for energy storing means; and executing control to change electric power supplied by the electric power supplying means over a response time corresponding to the set time constant for electric power supplying means so that the electric power supply and demand difference is kept within the preset given range, wherein the time constant for energy storing means is set to be longer than a set time constant for electric power supplying means.

(Supplementary Note 16)

The electric power control method according to Supplementary Note 15, comprising:

when the electric power supply and demand difference exceeds the preset given range, setting an energy equivalent to the electric power supply and demand difference as an initial energy, and executing control to make the energy storing means charged with the initial energy of electric power or discharge the initial energy of electric power, and also controlling the energy storing means so as to gradually decrease the charge or discharge electric power over the response time corresponding to the time constant for energy storing means so that the electric power changes from the initial energy to a given value; and executing control changing electric power supplied by the electric power supplying means over the response time corresponding to the time constant for electric power supplying means so that the electric power supply and demand difference is kept within the given range, the electric power supply and demand difference being made as a result that a charge or discharge energy of the energy storing means gradually decreases.

The abovementioned program is stored in a storage device or recorded on a computer-readable recording medium. For example, the recording medium is a portable medium such as a flexible disk, an optical disk, a magneto-optical disk and a semiconductor memory.

Although the present invention has been described above referring to the exemplary embodiments and so on, the present invention is not limited to the abovementioned exemplary embodiments. The configurations and details of the present invention may be changed and modified in various manners that can be understood by one skilled in the art within the scope of the present invention.

INDUSTRIAL APPLICABILITY

Because the present invention allows configuration of an autonomous decentralized electric power supply system, introduction of a small-scale and unstable generator such as renewable energy is facilitated. Moreover, for example, in developing countries where power supply capability is considerably lower than demand due to delay of building of electric power infrastructure, applying the technique of the present invention makes it possible to stabilize by autonomous decentralized control of generators in a small-scale electric power system without using advanced, reliable and fast real-time communication or real-time control which is a cost factor, and makes it possible to increase return on investment of building of an electric power supply network.

The present invention is based upon and claims the benefit of priority from Japanese patent application No. 2013-081353, filed on Apr. 9, 2013, the disclosure of which is incorporated herein in its entirety by reference.

DESCRIPTION OF REFERENCE NUMERALS 1 distribution substation
2 generator
3 distribution line
4, 41-44 load
5 electric power system
6 electric power measuring instrument
10 control device
10A arithmetic part
10B storage part
11 supplied energy acquisition part
12 consumed energy acquisition part
13 energy storage device control part
14 electric power control part
20 governor control part

The invention claimed is:

1. An electric power control system comprising:
an electric power supplying unit supplying electric power;
a load unit receiving supply of electric power and consuming the electric power;
an energy storing unit being charged with electric power supplied by the electric power supplying unit or discharging electric power to be supplied to the load unit;
a total supplied energy acquiring unit acquiring a total supplied energy, the total supplied energy being a total of electric power supplied by the electric power supplying unit and electric power discharged by the energy storing unit;
a total consumed energy acquiring unit acquiring a total consumed energy, the total consumed energy being a total of electric power consumed by the load unit and electric power with which the energy storing unit is charged;
an energy storage controlling unit, when an electric power supply and demand difference representing a difference between the total supplied energy and the total consumed energy exceeds a preset given range, making the energy storing unit charged with electric power or discharge electric power, and executing control to keep the electric power supply and demand difference within the given range, and also controlling the energy storing unit so as to decrease the charge or discharge electric power over a response time corresponding to a set time constant for energy storing unit; and
a supplied energy controlling unit executing control to change electric power supplied by the electric power supplying unit over a response time corresponding to a set time constant for electric power supplying unit so that the electric power supply and demand difference is kept within the preset given range,
wherein the time constant for energy storing unit is set to be longer than the time constant for electric power supplying unit,
wherein when the electric power supply and demand difference exceeds the preset given range, the energy storage controlling unit sets an energy equivalent to the electric power supply and demand difference as an initial energy, and executes control to make the energy storing unit charged with the initial energy of electric power or discharge the initial energy of electric power, and also controls the energy storing unit so as to gradually decrease the charge or discharge electric power over the response time corresponding to the time constant for energy storing unit so that the electric power changes from the initial energy to a given value; and
the supplied energy controlling unit executes control changing electric power supplied by the electric power supplying unit over the response time corresponding to the time constant for electric power supplying unit so that the electric power supply and demand difference is kept within the given range, the electric power supply and demand difference being made as a result that the energy storage controlling unit gradually decreases a charge or discharge energy of the energy storing unit.

2. The electric power control system according to claim 1, wherein:
the electric power supplying unit includes at least one generator; and
the supplied energy controlling unit executes control changing a supplied energy over the response time corresponding to the time constant for electric power supplying unit set for the generator so that the electric power supply and demand difference is kept within the preset given range, the supplied energy being an amount of electric power generated by the generator.

3. The electric power control system according to claim 2, wherein:
the electric power supplying unit includes a plurality of generators, and time constants for electric power supplying unit are set for the respective generators; and
the time constant for energy storing unit is set to be longer than the time constant for electric power supplying unit set for at least one of the generators.

4. The electric power control system according to claim 3, wherein:
the electric power supplying unit includes N generators; and
the time constant for energy storing unit is set to be longer than a $(N-1)^{th}$ in increasing order of the time constants for electric power supplying unit set for the generators.

5. The electric power control system according to claim 3, wherein the time constant for electric power supplying unit set for the generator is set so as to be shorter as a change amount of an amount of electric power generated by the generator, the change amount being a set characteristic, and the amount of electric power being controlled by the supplied energy controlling unit is larger.

6. The electric power control system according to claim 3, comprising an electric power supplying unit time constant setting unit for setting the time constant for electric power supplying unit for each of the generators.

7. The electric power control system according to claim 1, comprising a plurality of load units,
the electric power control system comprising a supply and demand condition controlling unit for controlling to stop electric power supply to some load units among the load units when the electric power supply and demand difference exceeds the preset given range,
wherein the energy storage controlling unit and the supplied energy controlling unit operate on a basis of the electric power supply and demand difference after stoppage of electric power supply to the some load units by the supply and demand condition controlling unit.

8. The electric power control system according to claim 7, wherein:
the electric power supplying unit includes an electric power system supplying a given energy of electric power and at least one generator;
the supply and demand condition controlling unit stops electric power supply to the some load units other than one or more load units among the load units when the electric power supply and demand difference exceeds the preset given range due to stoppage of electric power supply from the electric power system, the one or more load units being capable of operating with a total of amounts of electric power which can be generated by all the generators; and
the energy storage controlling unit executes control to make the energy storing unit charged with or discharge an initial energy of electric power, the initial energy being an energy keeping the electric power supply and demand difference within the given range, and the electric power supply and demand difference being that after stoppage of electric power supply to the some load units by the supply and demand condition controlling unit.

9. The electric power control system according to claim 8, wherein:
the some load units to which the supply and demand condition controlling unit stops electric power supply are preset on a basis of a total of amounts of electric power which can be generated, the amounts being preset for the respective generators; and
an initial energy is preset on a basis of a difference between a total of amounts of electric power generated by the generators and a total of consumed energies of the load units to which the supply and demand condition controlling unit does not stop electric power supply, the initial energy being an amount of electric power which the energy storing unit is charged with or discharges under control of the energy storage controlling unit.

10. An electric power control device connected to an electric power supplying unit supplying electric power, a load unit receiving supply of electric power and consuming the electric power, and an energy storing unit being charged with electric power supplied by the electric power supplying unit or discharging electric power to be supplied to the load unit, the electric power control device comprising:
a total supplied energy acquiring unit acquiring a total supplied energy, the total supplied energy being a total of electric power supplied by the electric power supplying unit and electric power discharged by the energy storing unit;
a total consumed energy acquiring unit acquiring a total consumed energy, the total consumed energy being a total of electric power consumed by the load unit and electric power with which the energy storing unit is charged; and
an energy storage controlling unit, when an electric power supply and demand difference representing a difference between the total supplied energy and the total consumed energy exceeds a preset given range, making the energy storing unit charged with electric power or discharge electric power, and executing control to keep the electric power supply and demand difference within the given range, and also controlling the energy storing unit so as to decrease the charge or discharge electric power over a response time corresponding to a set time constant for energy storing unit,
wherein in a case where the electric power supplying unit includes a supplied energy controlling unit, the time constant for energy storing unit is set to be longer than a set time constant for electric power supplying unit, the supplied energy controlling unit being for executing control to change electric power supplied by the electric power supplying unit over a response time corresponding to the set time constant for electric power supplying unit so that the electric power supply and demand difference is kept within the preset given range, wherein when the electric power supply and demand difference exceeds the preset given range, the energy storage controlling unit sets an energy equivalent to the electric power supply and demand difference as an initial energy, and executes control to make the energy storing unit charged with the initial energy of electric power or discharge the initial energy of electric power, and also controls the energy storing unit so as to gradually decrease the charge or discharge electric power over the response time corresponding to the time constant for energy storing unit so that the electric power changes from the initial energy to a given value.

11. A non-transitory computer-readable medium storing a program comprising instructions for causing an electric power control device, which is connected to an electric power supplying unit supplying electric power, a load unit receiving supply of electric power and consuming the electric power, and an energy storing unit being charged with electric power supplied by the electric power supplying unit or discharging electric power to be supplied to the load unit, to realize:

a total supplied energy acquiring unit acquiring a total supplied energy, the total supplied energy being a total of electric power supplied by the electric power supplying unit and electric power discharged by the energy storing unit;

a total consumed energy acquiring unit acquiring a total consumed energy, the total consumed energy being a total of electric power consumed by the load unit and electric power with which the energy storing unit is charged; and an energy storage controlling unit, when an electric power supply and demand difference representing a difference between the total supplied energy and the total consumed energy exceeds a preset given range, making the energy storing unit charged with electric power or discharge electric power, and executing control to keep the electric power supply and demand difference within the given range, and also controlling the energy storing unit so as to decrease the charge or discharge electric power over a response time corresponding to a set time constant for energy storing unit, wherein in a case where the electric power supplying unit includes a supplied energy controlling unit, the time constant for energy storing unit is set to be longer than a set time constant for electric power supplying unit, the supplied energy controlling unit being for executing control to change electric power supplied by the electric power supplying unit over a response time corresponding to the set time constant for electric power supplying unit so that the electric power supply and demand difference is kept within the preset given range, wherein when the electric power supply and demand difference exceeds the preset given range, the energy storage controlling unit sets an energy equivalent to the electric power supply and demand difference as an initial energy, and executes control to make the energy storing unit charged with the initial energy of electric power or discharge the initial energy of electric power, and also controls the energy storing unit so as to gradually decrease the charge or discharge electric power over the response time corresponding to the time constant for energy storing unit so that the electric power changes from the initial energy to a given value.

12. An electric power control method for controlling electric power of an electric power supplying unit supplying electric power, a load unit receiving supply of electric power and consuming the electric power, and an energy storing unit being charged with electric power supplied by the electric power supplying unit or discharging electric power to be supplied to the load unit, the electric power control method comprising:

acquiring a total supplied energy which is a total of electric power supplied by the electric power supplying unit and electric power discharged by the energy storing unit, and a total consumed energy which is a total of electric power consumed by the load unit and electric power with which the energy storing unit is charged;

when an electric power supply and demand difference representing a difference between the total supplied energy and the total consumed energy exceeds a preset given range, making the energy storing unit charged with electric power or discharge electric power, and executing control to keep the electric power supply and demand difference within the given range, and also controlling the energy storing unit so as to decrease the charge or discharge electric power over a response time corresponding to a set time constant for energy storing unit; and executing control to change electric power supplied by the electric power supplying unit over a response time corresponding to the set time constant for electric power supplying unit so that the electric power supply and demand difference is kept within the preset given range, wherein the time constant for energy storing unit is set to be longer than a set time constant for electric power supplying unit, wherein when the electric power supply and demand difference exceeds the preset given range, setting an energy equivalent to the electric power supply and demand difference as an initial energy, and executing control to make the energy storing unit charged with the initial energy of electric power or discharge the initial energy of electric power, and also controlling the energy storing unit as to gradually decrease the charge or discharge electric power over the response time corresponding to the time constant for energy storing unit so that the electric power changes from the initial energy to a given value; and executing control changing electric power supplied by the electric power supplying unit over the response time corresponding to the time constant for electric power supplying unit so that the electric power supply and demand difference is kept within the given range, the electric power supply and demand difference being made as a result that a charge or discharge energy of the energy storing unit gradually decreases.

* * * * *